(12) United States Patent
Casagrande et al.

(10) Patent No.: US 11,247,095 B2
(45) Date of Patent: Feb. 15, 2022

(54) FITNESS RACK

(71) Applicant: SeaSucker, LLC, Bradenton, FL (US)

(72) Inventors: Charles L. Casagrande, Bradenton, FL (US); Charles John Reda, Jr., Bradenton, FL (US)

(73) Assignee: SeaSucker, LLC, Bradenton, FL (US)

( * ) Notice: Subject to any disclaimer, the term of this patent is extended or adjusted under 35 U.S.C. 154(b) by 0 days.

(21) Appl. No.: 16/685,249

(22) Filed: Nov. 15, 2019

(65) Prior Publication Data

US 2020/0155890 A1 May 21, 2020

Related U.S. Application Data

(60) Provisional application No. 62/768,337, filed on Nov. 16, 2018.

(51) Int. Cl.
| | |
|---|---|
| *A63B 21/16* | (2006.01) |
| *A63B 21/04* | (2006.01) |
| *A63B 21/00* | (2006.01) |
| *A63B 21/055* | (2006.01) |
| *F16B 47/00* | (2006.01) |

(52) U.S. Cl.
CPC ........ *A63B 21/169* (2015.10); *A63B 21/0442* (2013.01); *A63B 21/0557* (2013.01); *A63B 21/4035* (2015.10); *F16B 47/00* (2013.01)

(58) Field of Classification Search
CPC .............. A63B 21/169; A63B 21/0442; A63B 21/4035; A63B 21/0557; A63B 21/062; A63B 21/0726; A63B 21/072; A63B 21/154; A63B 2210/50; A63B 21/16; A63B 2225/055; F16B 47/00; F16B 5/0692; F16B 2/22
See application file for complete search history.

(56) References Cited

U.S. PATENT DOCUMENTS

| | | | | |
|---|---|---|---|---|
| 5,087,005 | A * | 2/1992 | Holoff | A47G 23/0225 248/205.8 |
| 5,385,525 | A * | 1/1995 | Davis | A63B 21/0552 482/121 |
| 6,406,407 | B1 * | 6/2002 | Wiedmann | A63B 5/20 482/81 |
| 9,821,721 | B2 * | 11/2017 | Casagrande | B60R 9/10 |
| 10,080,917 | B2 * | 9/2018 | Freudinger | A63B 21/0442 |
| 10,723,276 | B2 * | 7/2020 | Casagrande | F16B 47/00 |

(Continued)

*Primary Examiner* — Andrew S Lo
(74) *Attorney, Agent, or Firm* — Christophers Weisberg, P.A.

(57) ABSTRACT

A fitness assembly for performing various exercises that is securably mountable to a mounting surface using one or more vacuum devices. In one embodiment, a vacuum-mounted fitness assembly comprises a base element and at least one vacuum device removably coupled to the base element. In one embodiment, the base element has an elongated shape and is removably coupled to two vacuum devices. In another embodiment, the base element has a circular or non-elongated shape and is removably coupled to one vacuum device. The base element includes a plurality of apertures and/or slits to which one or more bands and/or straps may be attached. In one embodiment, the fitness assembly also includes one or more accessories that enable the fitness assembly to be used to perform exercises such as boxing, squats, rowing, bicep curls, and others.

19 Claims, 16 Drawing Sheets

(56) References Cited

U.S. PATENT DOCUMENTS

| | | | |
|---|---|---|---|
| 10,737,632 B2* | 8/2020 | Casagrande | B60R 9/08 |
| 2004/0254035 A1* | 12/2004 | Hoffman | A63B 69/0091 |
| | | | 473/423 |
| 2008/0194392 A1* | 8/2008 | Langer | A63B 21/0004 |
| | | | 482/146 |
| 2014/0162853 A1* | 6/2014 | Kadar | A63B 21/026 |
| | | | 482/130 |
| 2015/0046490 A1* | 2/2015 | Jacobson | B60R 11/0252 |
| | | | 707/769 |
| 2015/0258367 A1* | 9/2015 | Tayebi | A63B 21/0442 |
| | | | 482/124 |
| 2016/0312945 A1* | 10/2016 | Freudinger | A63B 21/4043 |
| 2017/0333744 A1* | 11/2017 | Chapman | A63B 21/0442 |
| 2019/0329089 A1* | 10/2019 | Chapman | A63B 21/0442 |
| 2020/0009413 A1* | 1/2020 | Berklund | F16B 47/006 |
| 2020/0331406 A1* | 10/2020 | Casagrande | B60R 9/08 |

* cited by examiner

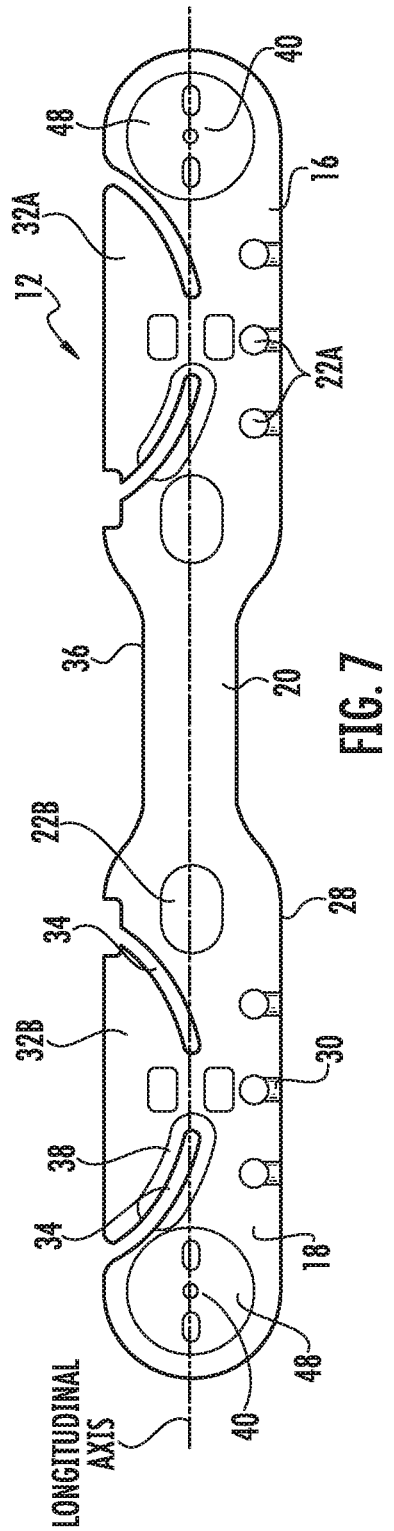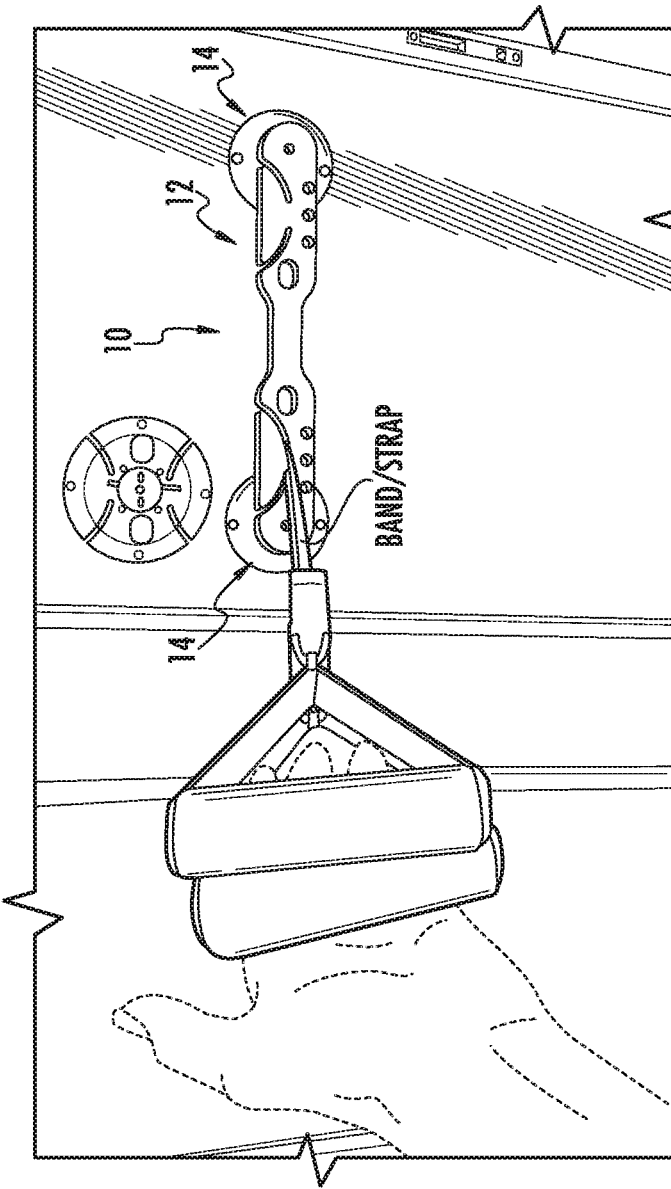

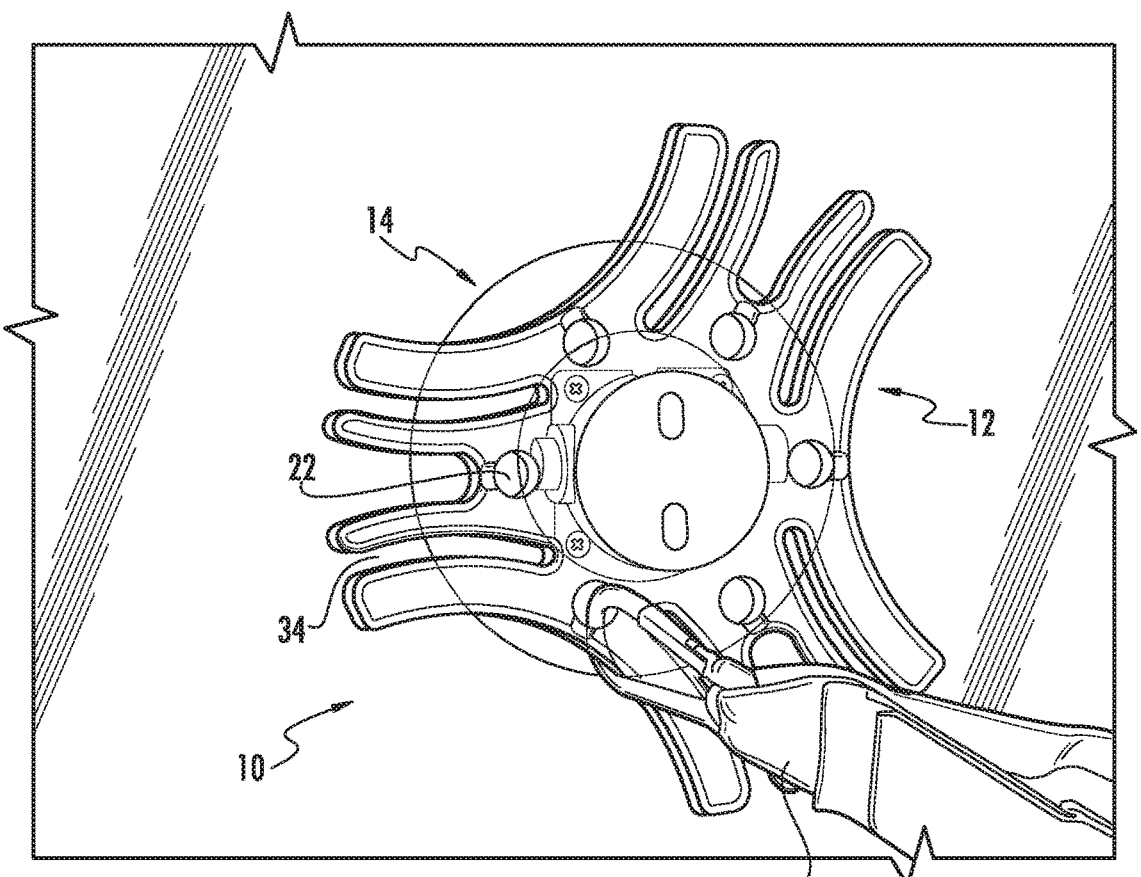
FIG. 24   BAND/STRAP
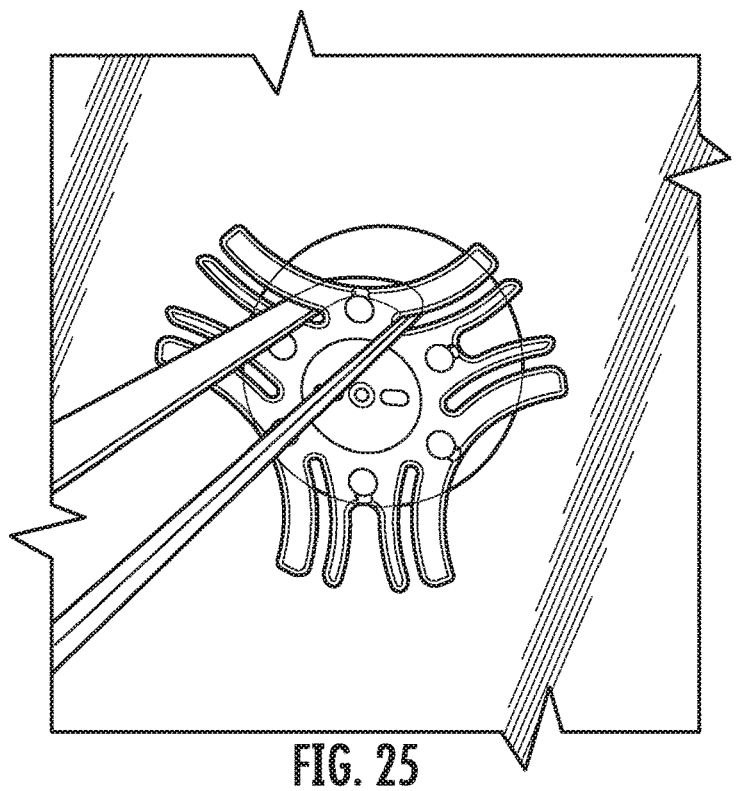
FIG. 25

FITNESS RACK

CROSS-REFERENCE TO RELATED APPLICATIONS

This application claims priority to U.S. Provisional Application No. 62/768,337, filed Nov. 16, 2018, entitled "Provisional Patent for FITNESS RACK," the entirety of which is incorporated herein by reference.

TECHNICAL FIELD

This disclosure relates to a fitness assembly for performing various exercises, the fitness assembly being securably and removably mountable to a mounting surface using one or more vacuum devices.

INTRODUCTION

The fitness industry is large and diverse. Resistance bands and straps, such as systems like TRX®, can provide efficient ways to exercise most muscle groups. Bands and straps are used mostly in big gym settings, as gyms have more bars, structures, and other options for strap attachment. Bands and strap systems are portable and do not require much room, which makes them an attractive option for home exercise. However, at home or when travelling it is difficult to find suitable strap attachment points and, once found, it is often not possible adjust the height. Even in gyms it can be a struggle to find a good strap attachment location, let alone one that enables adjustments such as angle and height of the attachment. Further, existing frames and racks for use with bands and straps are big, heavy, and expensive.

Often, attachment to a bar, rack, or other structure requires the band or strap to be fed through a hole or opening and looped around itself to secure it to the structure. However, this can be difficult or cumbersome, especially if one end of the strap is attached to a handle or other accessory.

Some types of exercises are gaining popularity, such as boxing, but can be prohibitively expensive and/or difficult to install the needed equipment at home. For example, a typical weight bag is about 70 pounds and must be hung from the ceiling or another structure. Many people are not willing or able to cut holes in the ceiling and/or to install the components necessary to suspend that much weight, especially those who rent houses or apartments.

Finally, physical and rehabilitation trainers need equipment that will allow them to help their clients exercise and build muscle, but also prevent injury. Also, in some cases, the client has limited mobility or range of movement, and the equipment used must be adaptable and adjustable.

SUMMARY

Some embodiments advantageously provide a fitness assembly for performing various exercises, the fitness assembly being securably and removably mountable to a mounting surface using one or more vacuum devices. In one embodiment, a vacuum-mounted fitness assembly comprises: a base element; and at least one vacuum device removably coupled to the base element.

In one aspect of the embodiment, the vacuum-mounted fitness assembly further comprises: a first accessory arm and a second accessory arm each removably coupled to and extending away from the base element, each of the first accessory arm and the second accessory arm including a plurality of apertures; and a stabilization bar removably coupled to and extending between the first accessory arm and the second accessory arm. In one aspect of the embodiment, each of the first and second accessory arms includes a first portion having a first longitudinal axis and a second portion having a second longitudinal axis that is different than the first longitudinal axis. In one aspect of the embodiment, the first portion of each of the first and second accessory arms is in contact with the base element and the stabilization bar extends between the second portions of the first and second accessory arms.

In one aspect of the embodiment, the vacuum-mounted fitness assembly further comprises: a support element removably coupled to and extending between the first accessory arm and the second accessory arm; and a vacuum device removably coupled to the support element. In one aspect of the embodiment, the support element is removably coupled to and extends between the first portions of the first and second accessory arms.

In one aspect of the embodiment, the base element has an elongated shape and includes a first portion, a second portion opposite the first portion, and a third portion between the first and second portions, and the at least one vacuum device includes a first vacuum device removably coupled to the first portion of the base element and a second vacuum device removably coupled to the second portion of the base element.

In one aspect of the embodiment, the at least one vacuum device includes a single vacuum device removably coupled to the base element at a center point of the base element.

In one aspect of the embodiment, the base element includes a plurality of apertures.

In one aspect of the embodiment, the base element includes at least one wedge defined by two slits in the base element.

In one embodiment, a vacuum-mounted fitness assembly comprises: a base element; a first vacuum device removably coupled to a first portion of the base element and a second vacuum device removably coupled to a second portion of the base element; a bag support plate removably coupled to and extending away from the base element, the bag support plate having a first surface and a second surface opposite the first surface; a first plate support arm and a second plate support arm, each of the first plate support arm and the second plate support arm having a first portion removably coupled to the base element and a second portion extending away from the base element in direction that is parallel to the first plate support arm and the second plate support arm; a stabilization bar removably coupled to and extending between the second portions of the first plate support arm and the second plate support arm, the stabilization bar being removably coupled to the first surface of the bag support plate; a first support element removably coupled to and extending between the first portions of the first plate support arm and the second plate support arm; a third vacuum device removably coupled to the first support element; a second support element removably coupled to and extending between the second portions of the first plate support arm and the second plate support arm; and a fourth vacuum device removably coupled to the second support element.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein:

FIG. 7 shows a rear view of the base element of FIG. 6;

FIG. 8 shows an exemplary method of attaching a strap to the base element of the fitness assembly of FIG. 1;

FIG. 24 shows an exemplary method of attaching a strap to a vacuum-mounted fitness assembly that includes the base element of FIGS. 22 and 23;

FIG. 25 shows an exemplary method of attaching a flat band to the vacuum-mounted fitness assembly of FIG. 24;

DETAILED DESCRIPTION

Figure 1:
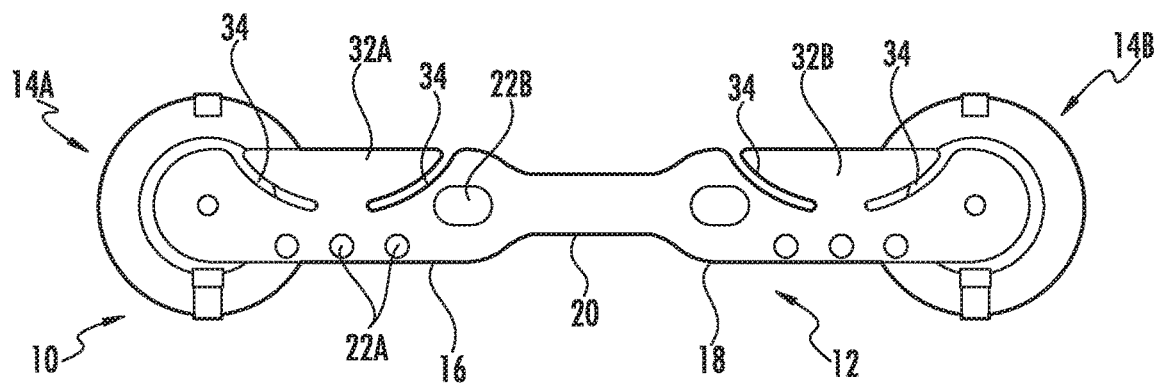
FIG. 1 shows a front view of an exemplary embodiment of a vacuum-mounted fitness assembly.

Before describing in detail exemplary embodiments, it is noted that the embodiments reside primarily in combinations of apparatus components and methods relating to a fitness assembly for performing various exercises. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
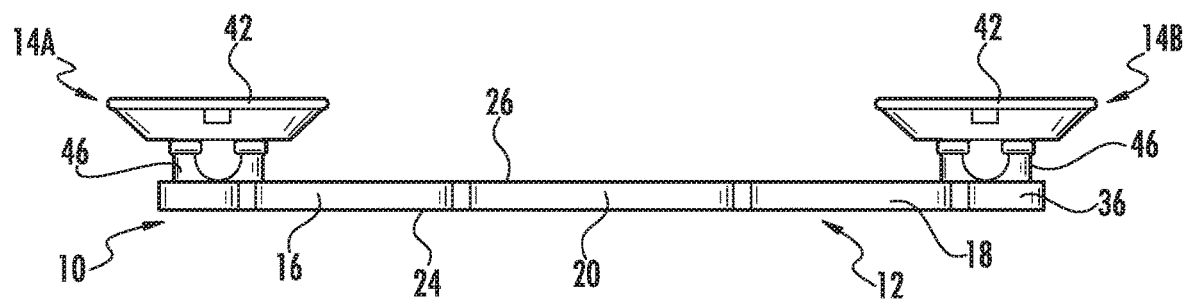
FIG. 2 shows a top view of the vacuum-mounted fitness assembly of FIG. 1.
Figure 3:
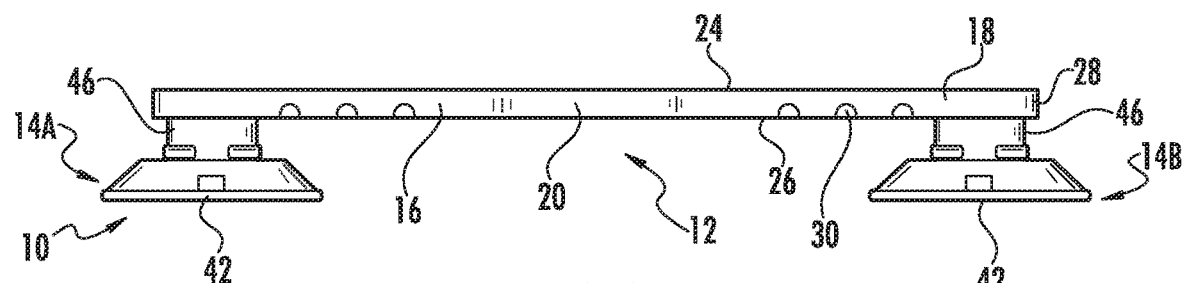
FIG. 3 shows a bottom view of the vacuum-mounted fitness assembly of FIG. 1.
Figure 4:
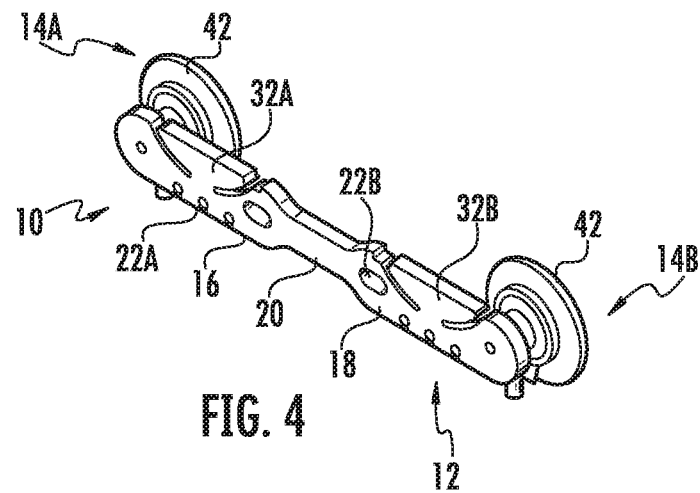
FIG. 4 shows a right perspective view of the vacuum-mounted fitness assembly of FIG. 1.
Figure 5:
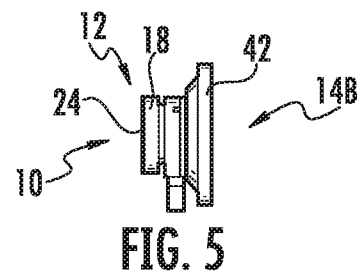
FIG. 5 shows a right side view of the vacuum-mounted fitness assembly of FIG. 1.
Figure 6:
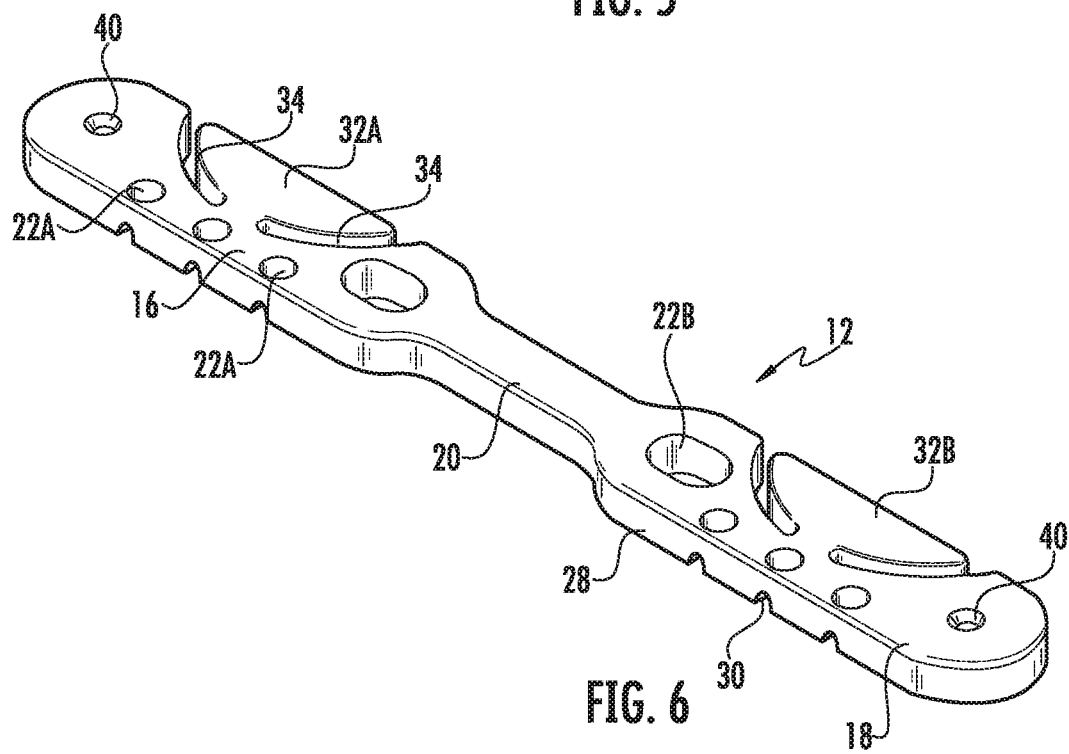
FIG. 6 shows a bottom perspective view of a base element of the fitness assembly of FIG. 1.
Figure 9:
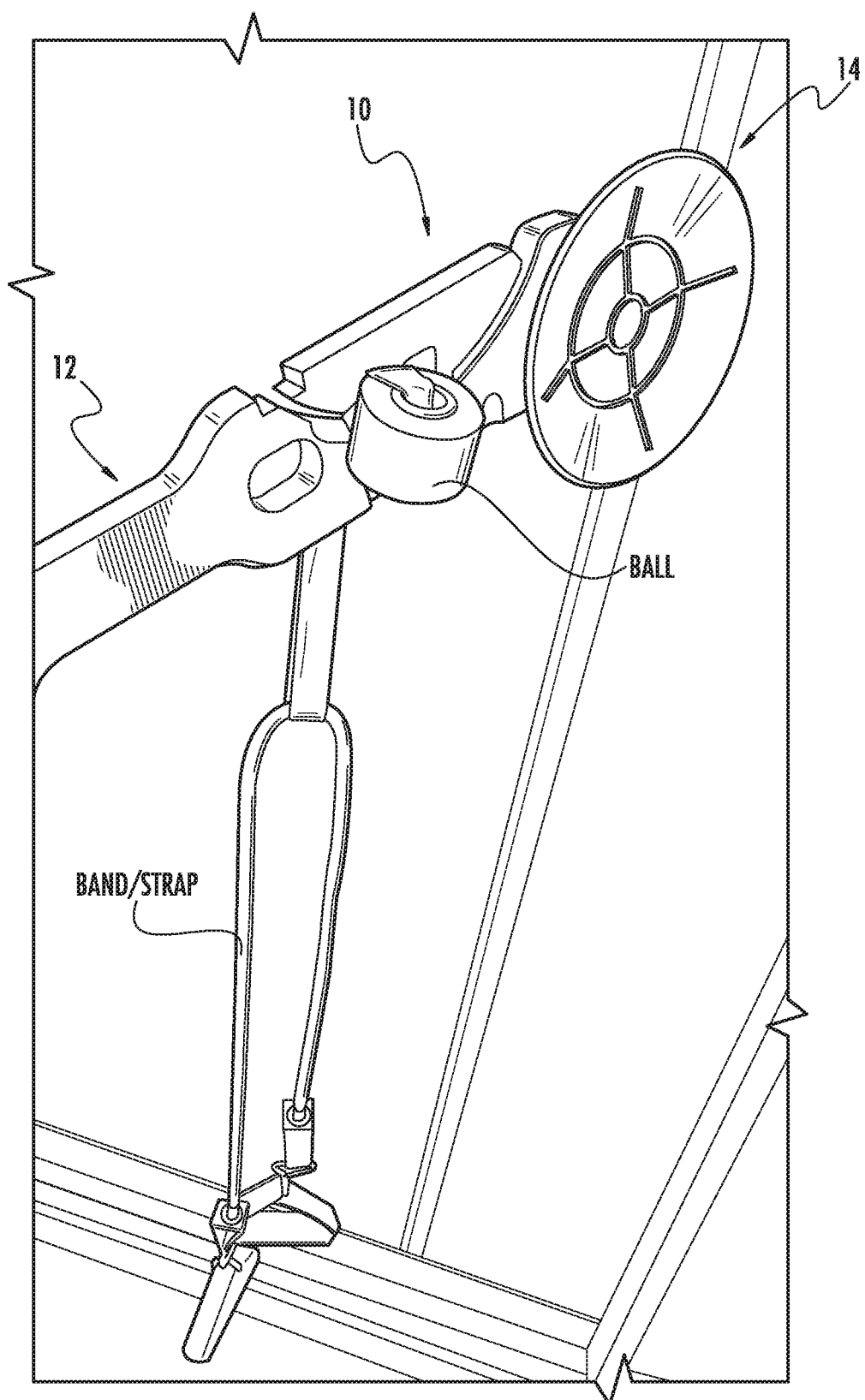
FIG. 9 shows another exemplary method of attaching a strap to the base element of the fitness assembly of FIG. 1.
Figure 10:
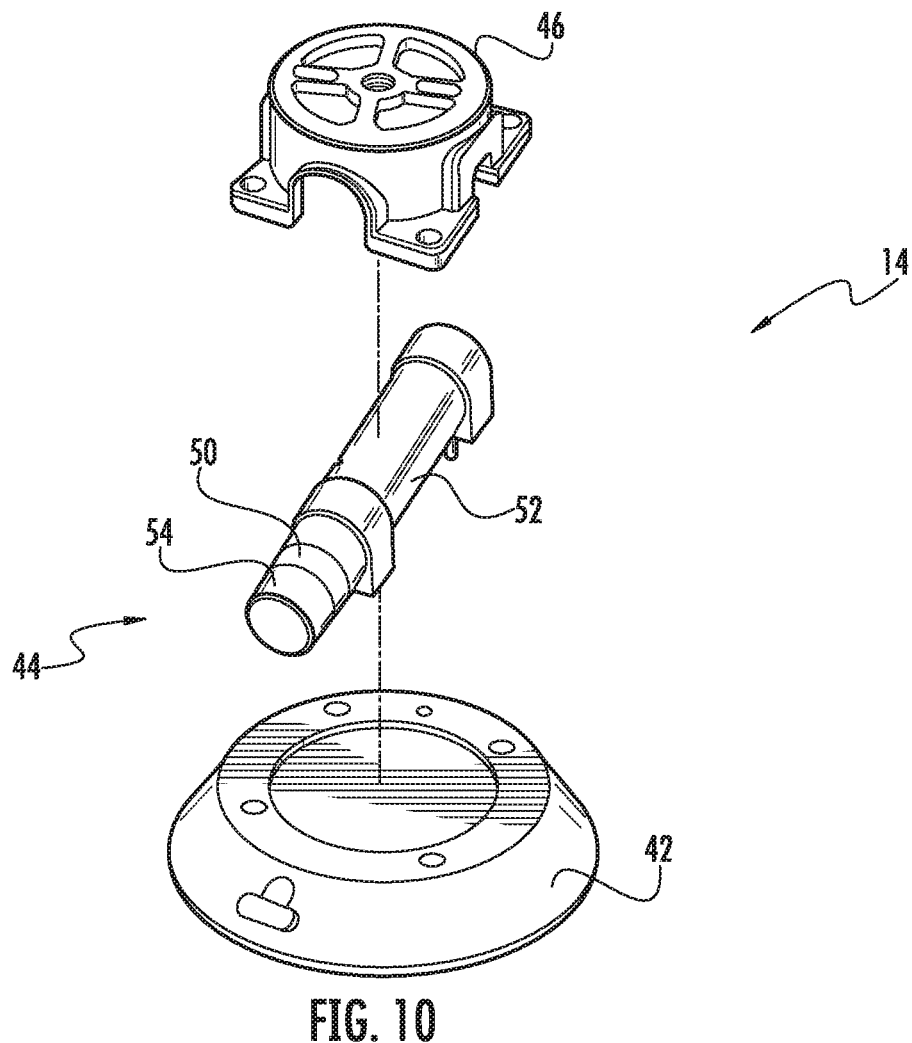
FIG. 10 shows an exploded view of an exemplary embodiment of a vacuum device.

The vacuum-mounted fitness assembly described herein (also referred to herein as a fitness assembly) generally includes at least one piece coupled to at least one vacuum device. The fitness assembly is securably and releasably mountable to a mounting surface by the vacuum device. Further, the fitness assembly is usable with one or more bands or straps. The location, height, and/or angle of the fitness assembly can be easily adjusted by breaking the vacuum seal between the vacuum device(s) and the mounting surface. The fitness assembly is also easily disassembled for storage or travel. The fitness assembly may also be used with one or more accessories to provide additional exercises or functionality, Referring now to the drawing figures in which like reference designators refer to like elements, there is shown in FIGS. 1-10 an exemplary embodiment of a vacuum-mounted fitness assembly and components thereof. A front view of the vacuum-mounted fitness assembly (referred to herein as "fitness assembly") is shown in FIG. 1, a top view thereof is shown in FIG. 2, a bottom view thereof is shown in FIG. 3, a perspective view thereof is shown in FIG. 4, and a side view thereof is shown in FIG. 5. A bottom perspective view of a base element of the fitness assembly is shown in FIG. 6 and a rear view of the base element is shown in FIG. 7. Further, exemplary methods of attaching a band or strap to the base element are shown in FIGS. 8 and 9. Still further, an exploded view of an exemplary vacuum device is shown in FIG. 10.

Continuing to refer to FIGS. 1-10, the fitness assembly 10 generally includes a base element 12 and at least one vacuum device 14. The base element 12 of the fitness assembly 10 shown in FIGS. 1-5 is shown in FIGS. 6 and 7 separated from the at least one vacuum device 14, and an exploded view of the vacuum device 14 is shown in FIG. 10. As is discussed below, the fitness assembly 10 of FIGS. 1-5 may be used alone or in combination with one or more accessories to provide additional functionality. In use, the base element 12 coupled to at least one vacuum device 14, which is/are mounted to a mounting surface by suction produced by a vacuum. In one embodiment, the base element 12 is removably coupled to at least one vacuum device 14. The mounting surface may be a vertical or at least substantially vertical surface such as a glass door, wall, car window, or other nonporous surface. However, the mounting surface may also be a non-vertical surface, such as a floor, a paddleboard, a tabletop, or the like.

Continuing to refer to FIGS. 1-10, in one embodiment the base element 12 has an elongate shape and generally includes a first portion 16, a second portion 18 opposite the first portion 16, and a third or middle portion 20 between the first portion 16 and second portion 18 portions. Each of the first, second, and third portions 16, 18, 20 have the same maximum width (put another way, the base element has a maximum width). Each of the first portion 16 and the second portion 18 has the same first maximum height, but the third portion 20 has a second maximum height that is less than the first maximum height. For example, as is best seen in FIGS. 1 and 7, the base element 12 has a narrow middle portion 20. The middle portion 20 provides a smaller area around which a band or strap may be passed or looped, which may facilitate coupling of the band or strap to the base element, even if the band or strap has a reduced length.

Continuing to refer to FIGS. 1-10, the base element 12 includes a plurality of apertures 22 to which a strap or band can be attached. Each aperture 22 extends through the base element 12, from the front surface 24 to the rear surface 26 of the base element 12. For example, a strap may be used that has an attachment mechanism at one end, such as a carabiner. The attachment mechanism may engage with one or more apertures 22 to quickly and easily secure the strap or band to the base element 12. For example, the carabiner may be clipped to the base element through one of the apertures 22. The number and configuration of the apertures 22 provide multiple ways and locations in which the straps or bands may be attached to the base element, thereby increasing the number of exercises that can be performed and allowing the user to adjust strap placement. The apertures 22 may all have the same size or inner diameter or, in the embodiment shown in FIGS. 1-9, the apertures 22 include a plurality of first apertures 22A proximate the lower edge 28 of the base element 12 in each of the first portion 16 and the second portion 18 of the base element 12 and a second aperture 22B (for example, at the center of or along the longitudinal axis of the base element 12) in each of the first portion 16 and the second portion 18, and the second aperture 22B has a larger inner diameter than the inner diameter of each of the first apertures 22A. Further, as can be seen in FIGS. 3, 6, and 7, in some embodiments the rear surface 26 of the base element 12 includes a recessed portion 30 from each aperture 22A to the lower edge of the base element 12. This may facilitate secure attachment of the band or strap to the base element, such as by use of a carabiner or clip, as the recessed portion 30 creates an area of the base element having a reduced thickness. It will be understood that the base element may include any suitable number and/or configuration of apertures, and that each aperture may have any suitable size and/or shape.

As is shown in FIGS. 1-9, the base element 12 also includes at least one wedge 32 for strap attachment. In the embodiment shown in FIGS. 1-9, the base element 12 includes a first wedge 32A in the first portion 16 and a second wedge 32B in the second portion 18. Each wedge 32 is created by two slits 34 in the base element 12. In one embodiment, the slits 34 forming the wedge are curved or curvilinear (have a slight curvature) and they extend from the upper edge 36 of the base element 12 to, and at an angle relative to, the longitudinal axis of the base element 12. In one exemplary use, as shown in FIG. 8, a band, such as a rubber resistance band, is looped over the wedge 32 such that the band is secured within the slits 34 forming the wedge 32 and passes over the rear surface 26 of the base element 12. In this way, the band is secured to the base element 12 without having to loop the band over itself or pass the band through an aperture or use an attachment mechanism. In one embodiment, at least a portion of the rear surface 26 of the base element 12 includes a recessed portion 38 proximate at least a portion of at least one slit 34. If the band or strap has a ball or knot in one end and, when the band or strap is within the slit 34, the ball or knot may at least partially nestle within the recess 38 for added security, as shown in FIG. 9.

Continuing to refer to FIGS. 1-10, each of the first portion 16 and the second portion 18 of the base element 12 also includes at least one screw aperture 40 to receive a screw for coupling a vacuum device 14 to the base element 12. Thus, in one embodiment, inner surface of the screw aperture 40 is threaded. In one embodiment, the fitness assembly 10 includes a first vacuum device 14A coupled to the first portion 16 of the base element 12 and a second vacuum device 14B coupled to the second portion 18 of the base element 12. In one embodiment, the vacuum device(s) 14 are suction cups, within which a vacuum is created by pressing the cup against the mounting surface. In another embodiment, the vacuum device(s) 14 are configured such that a vacuum is created using a vacuum pump. In one non-limiting example, each vacuum device 14 is as is shown in FIG. 10 and as shown and described in U.S. Pat. No. 9,821,721, the entirety of which is incorporated herein by reference. In this embodiment, each vacuum device 14 includes a vacuum pad 42, a vacuum pump 44, and a housing 46. The housing 46 is coupled to the vacuum pad 42 to enclose and secure the vacuum pump 44 to the vacuum pad 42, and the housing 46 is removably coupled to the base element 12, such as by a screw through the screw aperture 40. In one embodiment, each vacuum device 14, or at least the vacuum pad 42, may have an outer diameter of approximately six inches. Further, in one embodiment the rear surface 26 of the base element 12 includes at least one recessed portion 48, each recessed portion 48 being sized and configured to receive at least a portion of the housing 46 of a corresponding vacuum device 14. This may reinforce the coupling between the base element 12 and the vacuum device(s) 14.

Continuing to refer to FIGS. 1-10, in one embodiment the vacuum pump 44 includes a plunger 50 at least partially within a cylinder 52. At least a portion of the cylinder 52 is secured within the housing 46 to the vacuum pad 42 and a chamber within the cylinder is in fluid communication with the vacuum pad 42. At least a portion of the plunger 50 protrudes from the housing 46 a sufficient distance to allow a user to repeatedly press the plunger 50 to create the vacuum. In one embodiment, the vacuum pump 44 includes a check valve within the cylinder 52 (not shown) to prevent the transfer of fluids from the vacuum pad 42 (from a chamber between the vacuum pad 42 and a mounting surface when the vacuum device 14 is in use) back into the cylinder 52. Thus, the vacuum device 14 can be re-pumped without loss of any remaining vacuum. In one embodiment, the plunger 50 includes an indicator 54 on an exposed end of the plunger. The indicator may be a visual indicator 54, and in one embodiment includes a band of a contrasting color. As the user pumps the plunger 50 and a vacuum is created, the range of motion of the plunger 50 decreases and less of the plunger 50 is exposed from the housing 46. When the vacuum device 14 is fully primed (when the vacuum is created and the plunger can no longer be pumped), the indicator 54 may be entirely within the housing 46 and obscured from view, providing confirmation that an adequate vacuum has been created. If the seal between the vacuum pad 42 and the mounting surface breaks or if some of the vacuum is lost, the plunger 50 will protrude by an increasing amount from the housing 46, thereby revealing the indicator 54. If the user sees any portion of the indicator 54, the user can re-pump the vacuum device 14 before the seal is entirely lost. This may help prevent injury and/or damage to surfaces by preventing the fitness rack from unintentionally detaching from the mounting surface.

Figure 11:
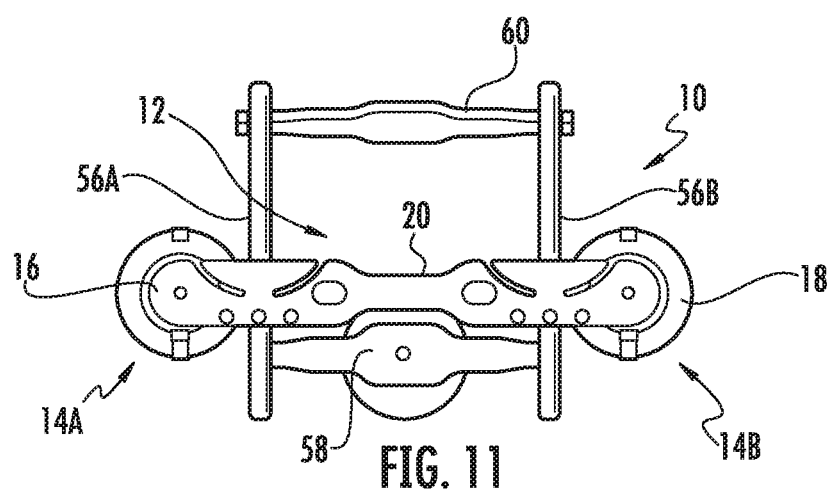
FIG. 11 shows a front view of another exemplary embodiment of a vacuum-mounted fitness assembly.
Figure 12:
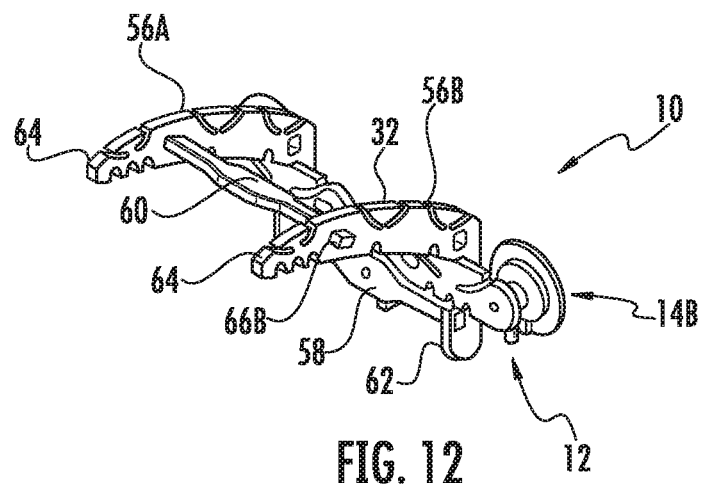
FIG. 12 shows a right perspective view of the vacuum-mounted fitness assembly of FIG. 11.
Figure 13:
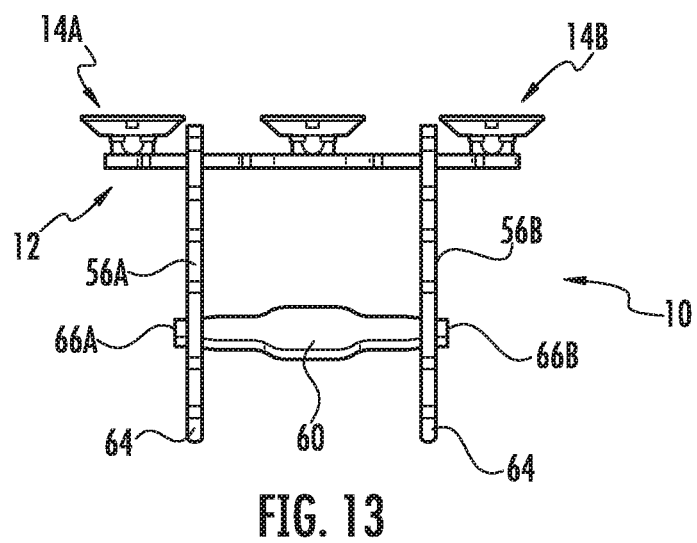
FIG. 13 shows a top view of the vacuum-mounted fitness assembly of FIG. 11.
Figure 14:
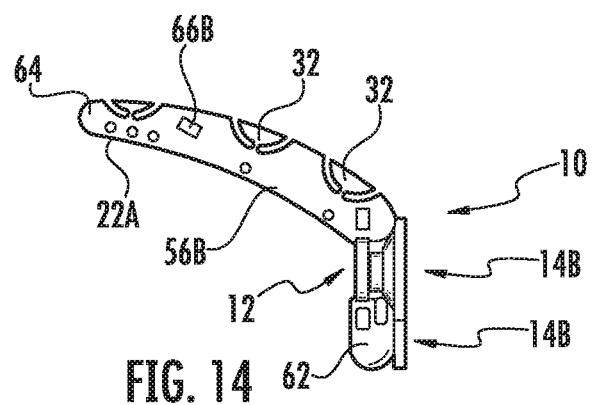
FIG. 14 shows a right side view of the vacuum-mounted fitness assembly of FIG. 11.
Figure 15:
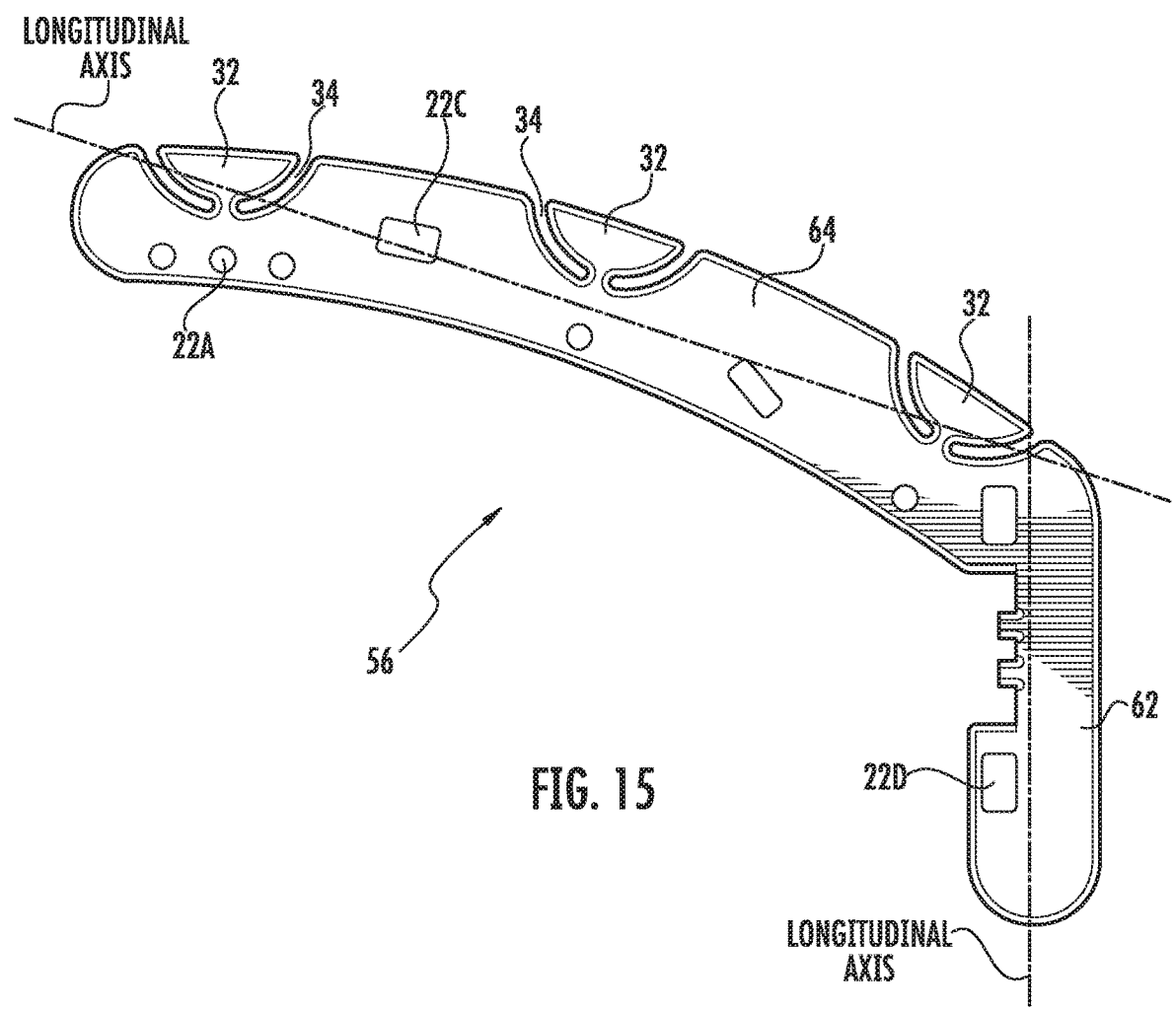
FIG. 15 shows a first side view of an accessory arm of the fitness assembly of FIG. 11.
Figure 16:
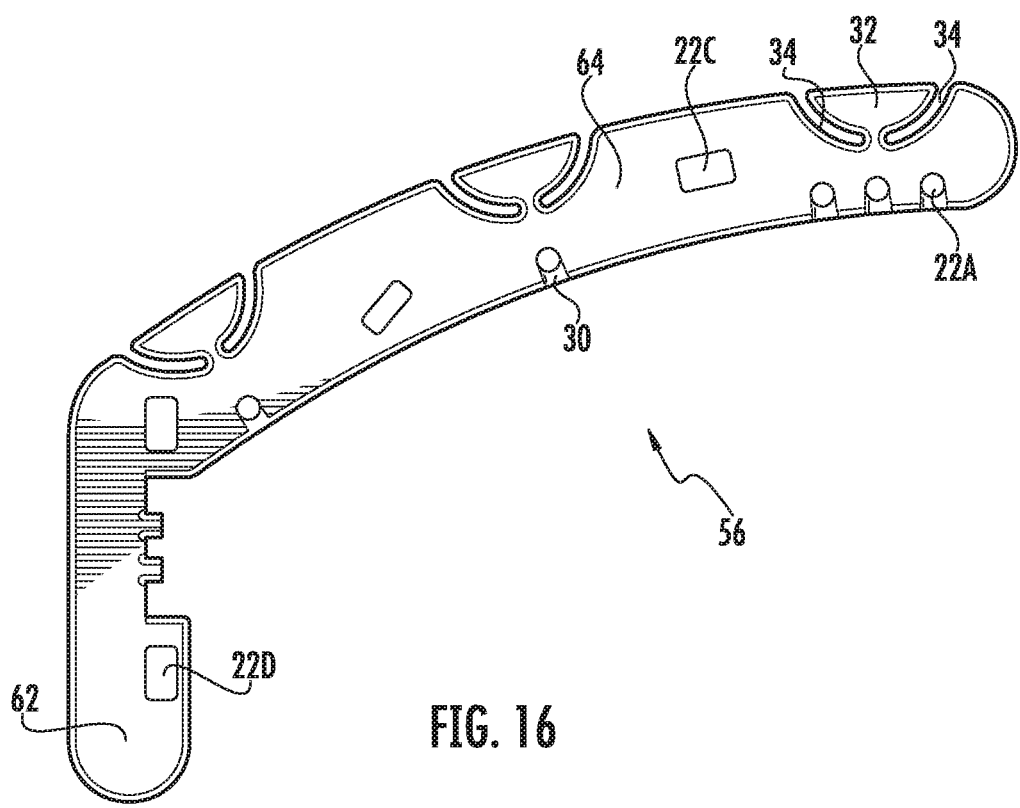
FIG. 16 shows a second side view of the accessary arm of FIG. 15.

Referring now to FIGS. 11-17, another exemplary embodiment of a vacuum-mounted fitness assembly 10 is shown. The fitness assembly 10 of FIGS. 11-19 includes the fitness assembly 10 shown in FIGS. 1-5 (that is, a base element 12 and at least one vacuum device 14), as well as accessories for providing additional points of attachment for one or more straps or bands. A front view of the vacuum-mounted fitness assembly 10 (fitness assembly) is shown in FIG. 11, a perspective view thereof is shown in FIG. 12, a top view thereof is shown in FIG. 13, and a side view thereof is shown in FIG. 14. Further, side views of an accessory arm 56 of the fitness assembly 10 shown in FIGS. 11-14 are shown in FIGS. 15 and 16.

Continuing to refer to FIGS. 11-17, in one embodiment, the fitness assembly 10 generally includes a base element 12 coupled to a first vacuum device 14A and a second vacuum device 14B, a first accessory arm 56A, a second accessory arm 56B, a stabilization bar 60, and, optionally, a support element 58 coupled to at least one vacuum device 14C. In one embodiment, the base element 12 and the support element 58 are coupled to at least one vacuum device 14. In one embodiment, the base element 12 and the support element 58 are each removably coupled to at least one vacuum device 14. In one exemplary use, the fitness assembly 10 of FIGS. 11-14 may be used to suspend bands or straps from the accessory arm for performing such exercises as pulldowns, cable crunches, supported squats, standing chest presses, triceps dips, or the like.

Continuing to refer to FIGS. 11-17, in one embodiment the fitness assembly 10 is assembled such that the base element 12 is coupled to the at least one vacuum device 14, which is mounted to a mounting surface by suction produced by a vacuum. In one embodiment, the base element 12 is coupled to a first vacuum device 14A and a second vacuum device 14B, as discussed above regarding FIGS. 1-10. Further, in one embodiment the base element 12 at vacuum devices 14 of the fitness assembly 10 shown FIGS. 11-14 are as shown and described in FIGS. 1-10. The first and second accessory arms 56A, 56B may be mirror images of each other or identical to each other, or the first and second accessory arms 56A, 56B may have different features and/or appearance. In one embodiment, each accessory arm 56 includes a first portion 62 having a first longitudinal axis and a second portion 64 having a second longitudinal axis that is different than the first longitudinal axis. For example, the first and second longitudinal axes may between approximately 30° and approximately 90° relative to each other. In one embodiment, as is best seen in FIGS. 14-16, the second portion 64 is longer than the first portion 62. When the fitness assembly 10 is assembled, the first portion 62 of each accessory arm 56 is between the base element 12 and the mounting surface, and may be in contact with at least a portion of the rear surface 26 of the base element 12. The second portion 64 of each accessory arm 56 is located above the base element 12 and at least a portion of each accessory arm 56 is in contact with the upper edge 36 of the base element 12. In one embodiment, at least a portion of each accessory arm 56 is configured to be received within or otherwise engage with at least one aperture, slit, recess, or other feature in the base element 12. In one embodiment, at least a portion of the base element 12 is configured to be received within or otherwise engage with at least one aperture, slit, recess, or other feature in each of the accessory arms 56. The stabilization bar 60 extends between the second portions 64 of the accessory arms 56. In one embodiment, the stabilization bar 60 includes a first tab 66A at a first end and a second tab 66B at a second end opposite the first end. The second portion 64 of the first accessory arm 56A includes an aperture 22C sized and configured to receive the first tab 66A of the stabilization bar 60 and the second portion 64 of the second accessory arm 56B includes an aperture 22C sized and configured to receive the second tab 66B of the stabilization bar 60. For example, the tabs 66A, 66B may be securably received within the apertures 22C of the accessory arms 56A, 56B by friction fit.

Continuing to refer to FIGS. 11-17, in one embodiment at least the second portion of each accessory arm 56 includes various apertures (for example, as shown in FIGS. 15 and 16) that may be sized and/or configured similar to the apertures 22 in the base element 12 discussed above. For example, each accessory arm 56 may include a plurality of apertures 22A proximate a first edge of the accessory arm 56 and at least one surface of the accessory arm 56 may include a recessed portion that extends from each aperture 22A to the first edge of the accessory arm 56 (as shown in FIG. 16). Further, in one embodiment at least the second portion 64 of each accessory arm 56 also includes at least one wedge 32 that is sized and/or configured similar to the wedge 32 in the base element 12 discussed above. Thus, bands and/or straps may be secured to one or both accessory arms, in addition to the base element.

In one embodiment, a pulley system (not shown) may be attached to one or both accessory arms and used to perform weighted exercises, such as shoulder exercises, chest presses, triceps extensions, and the like. In one embodiment, the pulley system includes at least one pulley removably couplable to one or both accessory arms and a cable fed through the pulley(s). The pulley system may include a first pulley coupled to a first aperture 22A in the second portion 64 of the accessory arm 56 and a second pulley coupled to a second aperture 22B in the second portion 64 of the accessory arm 56. In one embodiment, the pulleys, are removably coupled to the accessory arm 56 by a carabiner, clip, or other removable fastening. Further, in one embodiment a cable has a first end that is attached to, and in one embodiment is removably attached to, a handle, loop, or other device graspable by the user, and a second end that is attached to, and in one embodiment is removably attached to, a weight, such as a kettlebell, sandbag, dumbbell, or the like. The weight may be easily interchangeable so the user can adjust resistance quickly and as needed. The user pulls on the first end of the cable to advance the cable through the pulleys, against the weight.

In one embodiment, a traction system (not shown) may be attached to one or both accessory arms. For example, the traction system may include a sling or brace configured to engage the user's head and/or chin and may be configured to attach to one or both accessory arms by a carabine, clip, or other removable fastening. In use, the user may place at least a portion of the sling over their head and/or chin and may hang, lean, or otherwise gently move away from the accessory arm(s) to provide traction to the user's neck.

Figure 17:
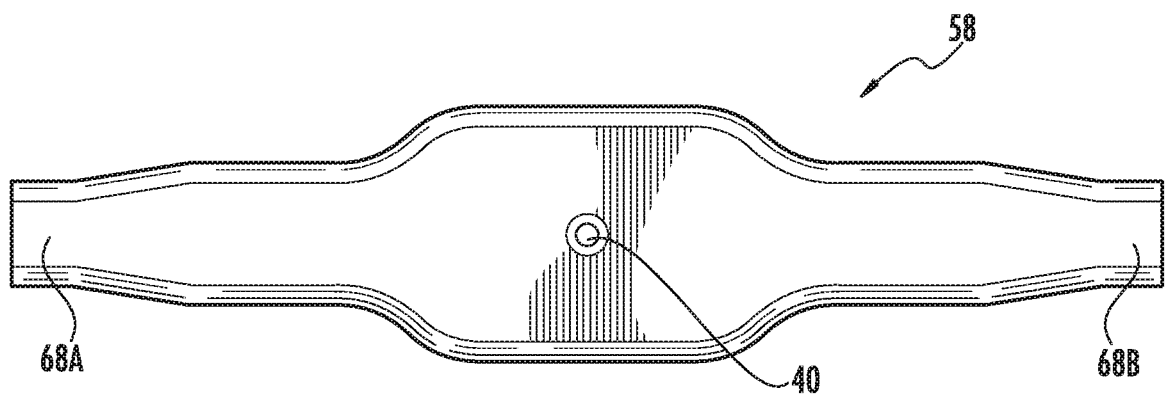
FIG. 17 shows a front view of a support element of the fitness assembly of FIG. 11.
Figure 18:
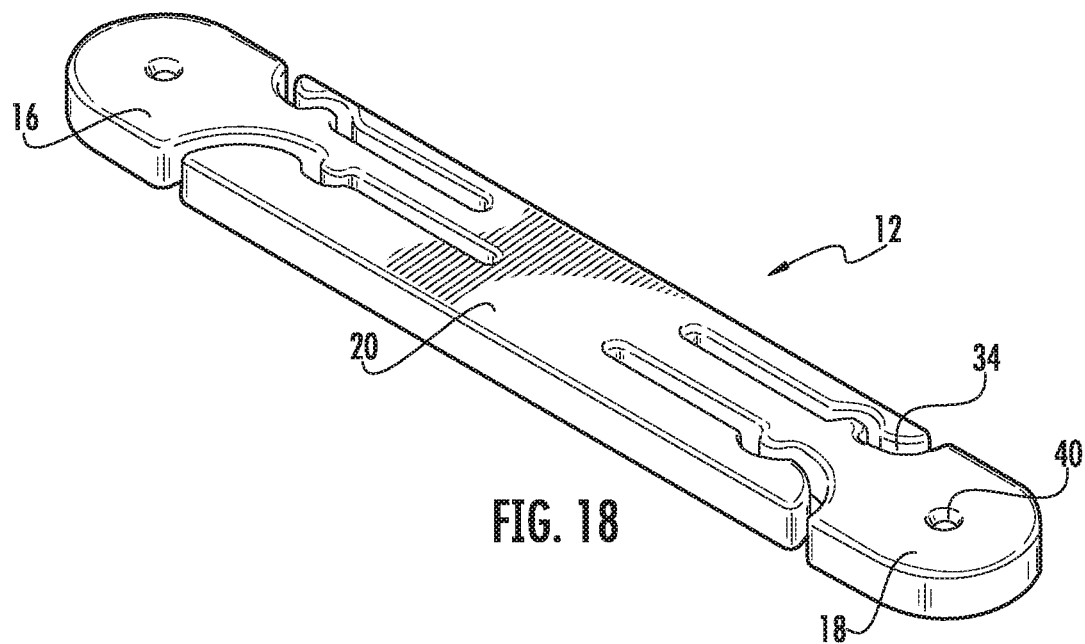
FIG. 18 shows a perspective view of another exemplary embodiment of a base element for use with a vacuum-mounted fitness assembly.
Figure 19:
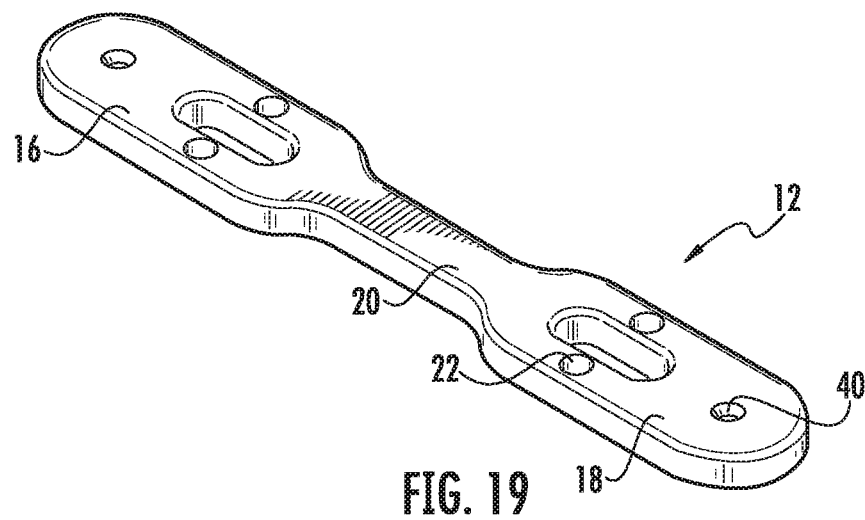
FIG. 19 shows a perspective view of another exemplary embodiment of a base element for use with a vacuum-mounted fitness assembly.
Figure 20:
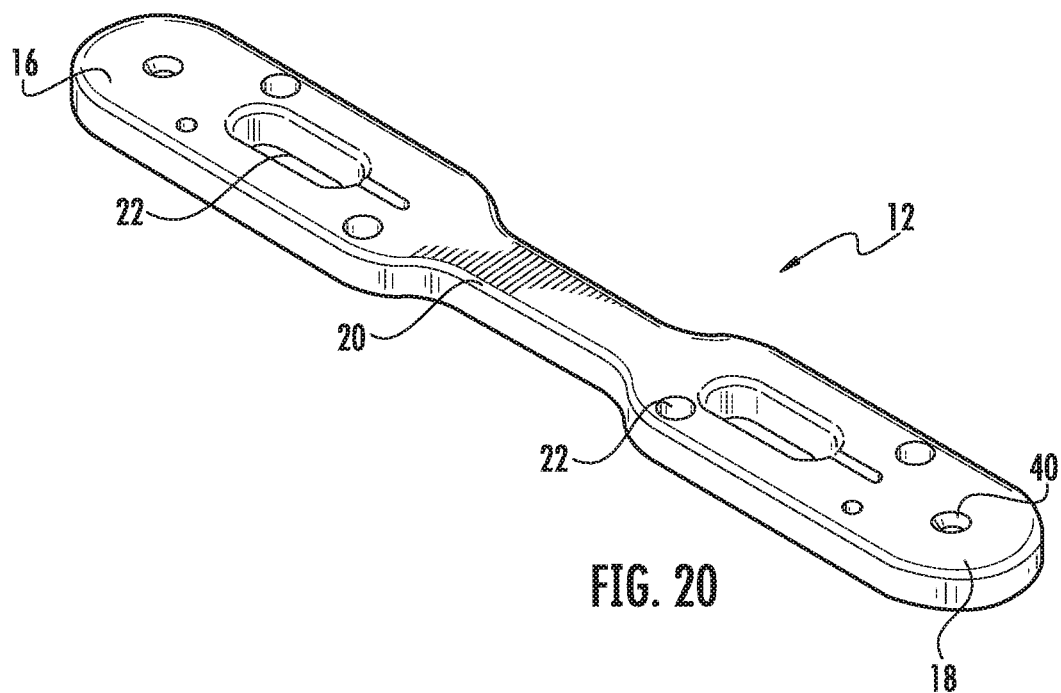
FIG. 20 shows a perspective view of another exemplary embodiment of a base element for use with a vacuum-mounted fitness assembly.
Figure 21:
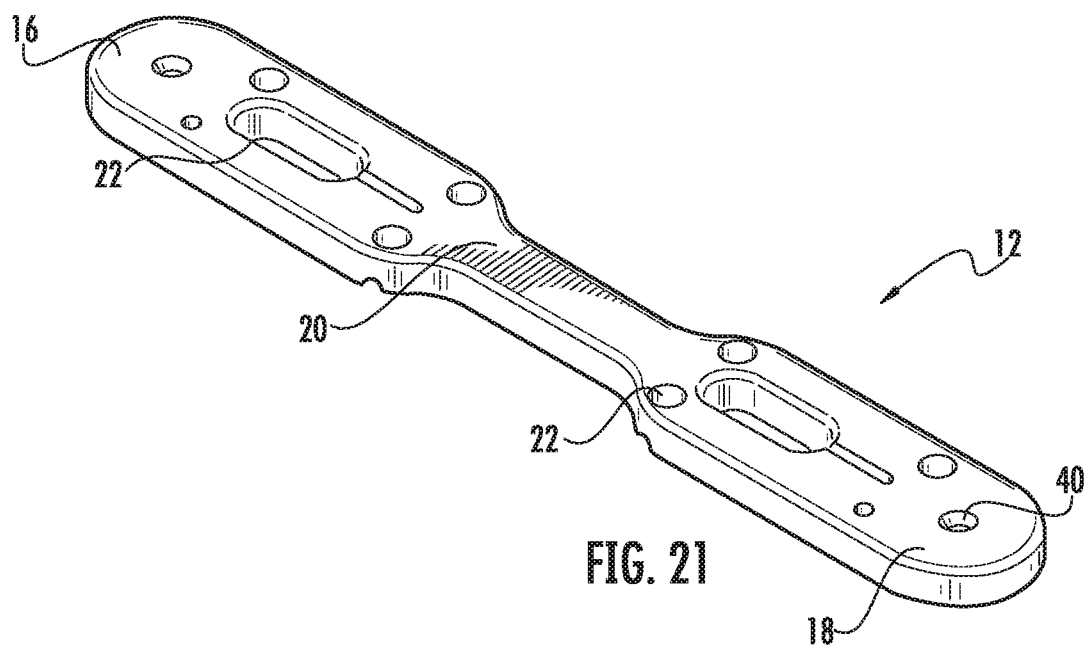
FIG. 21 shows a perspective view of another exemplary embodiment of a base element for use with a vacuum-mounted fitness assembly.
Figure 22:
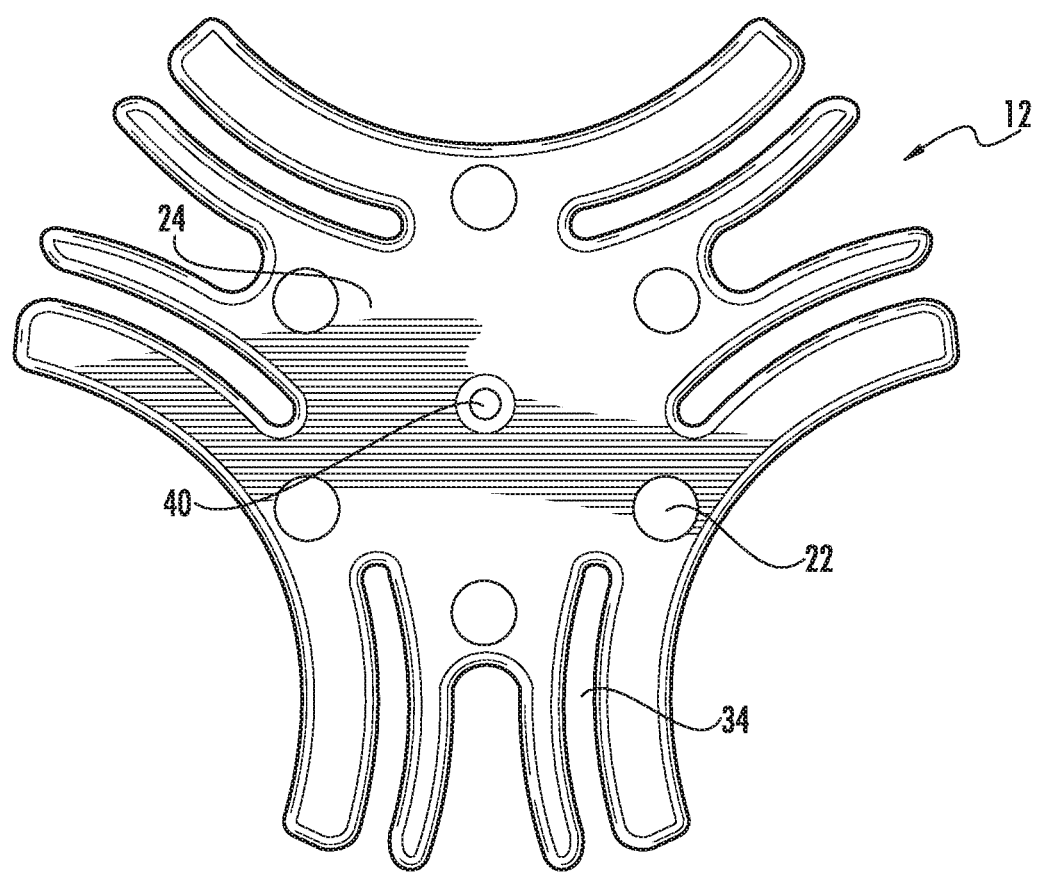
FIG. 22 shows a front view of another exemplary embodiment of a base element for use with a vacuum-mounted fitness assembly.
Figure 23:
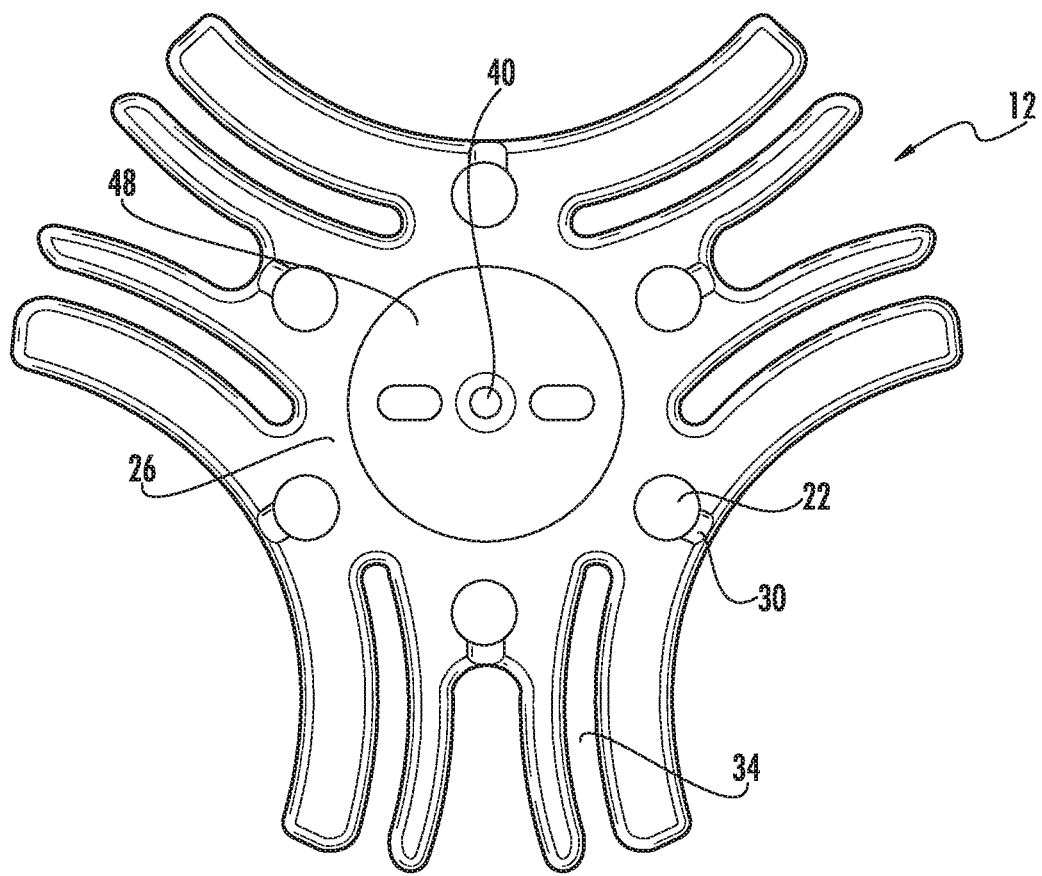
FIG. 23 shows a rear view of the base element of FIG. 22.

Continuing to refer to FIGS. 11-17, in one embodiment the fitness assembly 10 optionally includes the support element 58, which is coupled to at least one vacuum device 14. In one embodiment, the support element 58 is coupled to one vacuum device 14C, which provides the same functionality as the vacuum device 14 discussed above regarding FIGS. 1-10. A front view of the support element 58 is shown in FIG. 17. The support element 58 provides an additional point of attachment between the fitness assembly 10 and the mounting surface, and further reduces the changes of the fitness assembly becoming detached from the mounting surface. In one embodiment the support element 58 includes a screw aperture 40 at a centerpoint of the support element 58, though which the support element 58 is coupled to the vacuum device 14C, and a recessed portion 48 on the rear surface 26 that is sized and configured to receive at least a portion of the housing 46 of the vacuum device 14. The support element 58 also includes a first tab 68A at a first end and a second tab 68B at a second end opposite the first end. In one embodiment, the first portion 62 of the first accessory arm 56A includes an aperture 22D sized and configured to receive the first tab 68A of the support element 58 and the first portion 62 of the second accessory arm 56B includes an aperture 22D sized and configured to receive the second tab 68B of the support element 58.

In another exemplary embodiment, a vacuum-mounted fitness (not shown) includes the fitness assembly 10 shown in FIGS. 1-5 (that is, a base element 12 and at least one vacuum device 14), as well as accessories to enable use of the fitness assembly 10 for additional exercises and/or to provide additional points of attachment for one or more straps or bands.

In one embodiment the fitness assembly 10 generally includes a base element 12 coupled to a first vacuum device 14A and a second vacuum device 14B, a first accessory arm 56A, a second accessory arm 56B, a foot plate, and, optionally, a support element 58 coupled to at least one vacuum device 14C. In one embodiment, the base element 12 and the support element 58 are each removably coupled to at least one vacuum device 14. In one exemplary use, one or more straps or bands are attached to the accessory arm(s) 56 and/or the base element 12, and a user may stand on the foot plate and use the fitness assembly to perform such exercises as squats, hamstring curl, or the like. Additionally or alternatively, the user may sit in a chair in front of the fitness assembly 10 and place their feet on the foot plate for support while performing such exercises as curls, arm raises, rear deltoid exercises, or the like.

Referring again to FIGS. 11-14, the fitness assembly 10 is assembled such that the base element 12 is coupled to the at least one vacuum device 14, which is mounted to a mounting surface by suction produced by a vacuum. In one embodiment, the base element 12 is coupled to a first vacuum device 14A and a second vacuum device 14B, as discussed above regarding FIGS. 1-10. In one embodiment the base element 12 and vacuum devices 14 of the fitness assembly 10 shown FIGS. 11-14 are as shown and described in FIGS. 1-10. When the fitness assembly 10 is assembled, the first portion 62 of each accessory arm 56 is between the base element 12 and the mounting surface, and may be in contact with at least a portion of the rear surface 26 of the base element 12. The second portion 64 of each accessory arm 56 is located below the base element 12 and at least a portion of each accessory arm 56 is in contact with the lower edge 28 of the base element 12. In one embodiment not shown in the drawings, the foot plate extends between the second portions 64 of the accessory arms 56. In one embodiment, the foot plate includes a first tab at a first end and a second tab at a second end opposite the first end. The second portion 64 of the first accessory arm 56A includes an aperture 22C sized and configured to receive the first tab of the foot plate and the second portion 64 of the second accessory arm 56B includes an aperture 22C sized and configured to receive the second tab of the foot plate. For example, the tabs may be securably received within the apertures 22C of the accessory arms 56A, 56B by friction fit.

In another embodiment, not shown in the drawings, the foot plate is at least substantially planar, but it will be understood that the foot plate may have any suitable size, shape, and/or configuration. In one embodiment, the foot plate includes slits or perforations, although it will be understood that other surface ornamentation, stability elements, or other features may be used.

In another embodiment the fitness assembly 10 shown in FIG. 11-14 optionally includes the support element 58, which is coupled to at least one vacuum device 14C not shown in the drawings. In one embodiment, the support element 58 is coupled to one vacuum device 14C, which provides the same functionality as the vacuum device 14 discussed above regarding FIGS. 1-10. The support element 58 provides an additional point of attachment between the fitness assembly 10 and the mounting surface, and further reduces the changes of the fitness assembly becoming detached from the mounting surface. In one embodiment, the support element 58 is coupled to one vacuum device 14C and is the same as the support element 58 discussed above regarding FIGS. 11-17.

Not shown in the drawings is another exemplary embodiment of a vacuum-mounted fitness assembly 10. In one embodiment, the fitness assembly 10 includes the fitness assembly 10 shown in FIGS. 1-6 that is, a base element 12 and at least one vacuum device 14). In another embodiment, the fitness assembly 10 includes a base element 12 and at least one vacuum device 14, but the base element 12 may be sized and configured differently than that shown in FIGS. 1-9. In one embodiment, not shown in the drawings, the fitness assembly 10 also includes accessories for providing additional points of attachment for one or more straps or bands.

Also not shown in the drawings, is another embodiment in which the fitness assembly 10 generally includes a base element 12 coupled to a first vacuum device 14A and a second vacuum device 14B, a first plate support arm, a second plate support arm, a stabilization bar 60, a bag support plate, a first or lower support element 58 coupled to at least one vacuum device 14C, and a second or upper support element coupled to at least one vacuum device 14D. In one embodiment, the base element 12 is removably coupled to the vacuum devices 14A, 14B, the lower support element 58 is removably coupled to at least one vacuum device 14C, and the upper support element is removably coupled to at least one vacuum device 14D. In one embodiment, the base element 12, vacuum device(s) 14 are as shown and described in FIG. 10, the stabilization bar 60 and lower support element 58 is as shown and described in FIGS. 11-17. In one exemplary use, not shown in the drawings, the fitness assembly 10 may be used to suspend a speed bag, punching bag, or other boxing and/or kickboxing accessory.

In another embodiment the fitness assembly 10 is assembled such that the base element 12 is coupled to the at least one vacuum device 14, which is mounted to a mounting surface by suction produced by a vacuum. In one embodiment, the base element 12 is removably coupled to a first vacuum device 14A and a second vacuum device 14B, as discussed above regarding FIGS. 1-10. In one embodiment, the fitness assembly 10 includes a first plate support arm and a second plate support arm (not shown). The first and second plate support arms may be mirror images of each other or identical to each other, or the first and second plate support arms may have different features and/or appearance. In one embodiment, each plate support arm includes a first portion having a first longitudinal axis and a second portion having a second longitudinal axis that is different than the first longitudinal axis. For example, each the first and second longitudinal axes are at approximately 90° from each other (±10°). When the fitness assembly 10 is assembled, the first portion of each plate support arm is oriented orthogonally, or at least substantially orthogonally, to the base element 12 and is configured to extend along the mounting surface (and, in one embodiment, between the base element 12 and the mounting surface), and the second portion of each plate support arm is located above the base element 12 (and in one embodiment, in contact with at least a portion of the upper edge 36 of the base element 12) and is configured to extend away from the mounting surface. In one embodiment, at least a portion of each plate support arm is configured to be received within or otherwise engage with at least one aperture, slit, recess, or other feature in the base element 12. In one embodiment, at least a portion of the base element 12 is configured to be received within or otherwise engage with at least one aperture, slit, recess, or other feature in each of the plate support arms. Further, the stabilization bar 60 extends between the second portions of the plate support arms. In one embodiment, the stabilization bar 60 includes a first tab 66A at a first end and a second tab 66B at a second end opposite the first end. The second portion of the first plate support arm includes an aperture 22C sized and configured to receive the first tab 66A of the stabilization bar 60 and the second portion of the second plate support arm includes an aperture 22C sized and configured to receive the second tab 66B of the stabilization bar 60. For example, the tabs 66 may be securably received within the apertures 22 of the plate support arms by friction fit. Still further, the lower support element 58, which is coupled to at least one vacuum device 14C (and, in one embodiment, is removably coupled to at least one vacuum device 14C), includes a first tab 68A sized and configured to be received within an aperture 22D in the first portion of the first plate support arm and a second tab sized 68B and configured to be received within an aperture 22D in the first portion of the second plate support arm. Thus, when the fitness assembly 10 is assembled, the lower support element 58 extends between the second first of the first and second plate support arms.

In another embodiment, an upper support element (not shown) which is coupled to at least one vacuum device 14D, extends between the second portions of the first and second plate support arms. In one embodiment, the upper support element is removably coupled to at least one vacuum device 14. In one embodiment, the upper support element extends between the second portions of the plate support arms at locations that are vertically aligned, when the fitness assembly 10 is in use, with the locations at which lower support element 58 extends between the first portions of the plate support. In one embodiment, the upper support element has a curved or arched shape so the upper support element passes over at least a portion of the bag support plate. However, it will be understood that the upper support element may have other suitable sizes, shapes, or configurations. In one embodiment, the upper support element includes a first tab sized and configured to be received within an aperture in the second portion of the first plate support arm and a second tab sized and configured to be received within an aperture in the second portion of the second plate support arm.

In another embodiment, the bag support plate generally extends away from the base element 12 and the mounting surface (that is, generally in the same direction as, or parallel or at least substantially parallel to, the plate support arms) when the fitness assembly 10 is in use. In one embodiment, the bag support plate includes a first portion that is sized and configured to be removably coupled to the base element 12 and a second portion opposite the first portion that is sized and configured to attach to and suspend a fitness accessory, such as a speed bag, punching bag, or the like. In one embodiment, the first portion of the bag support plate includes one or more extensions that are sized and configured to be received within one or more apertures 22 of the base element 12. In the embodiment, the second portion of the bag support plate has a generally circular shape and includes an accessory attachment element on the lower surface. In one embodiment, the stabilization bar 60 and the bag support plate each include an aperture, such as a screw aperture 40, through which a screw or other fastening device may be passed to secure the stabilization bar 60 to or against the upper surface of the bag support plate, thereby providing additional support and stabilization for the bag support plate. For example, in one embodiment, the fitness assembly 10 shown in FIGS. 11-14 may be able to support a fitness accessory having a weight of up to 200 lbs suspended from the bag support plate.

Referring now to FIGS. 18-21, additional exemplary embodiments of a base element 12 for use with a vacuum-mounted fitness assembly 10 are shown. In these embodiments, the base element 12 generally has an elongate shape with a first portion 16, a second portion 18 opposite the first portion 16, and a third or middle portion 20 therebetween. Further, the base element 12 includes and a variety of apertures 22 and/or slits to which one or more bands and/or straps may be attached. Further, in some embodiments, the base element 12 is configured to be removably to at least two vacuum devices 14. In one embodiment, base element 12 is configured to be removably to at least three vacuum devices 14: a first vacuum device coupled to the first portion 16, a second vacuum device coupled to the second portion 18, and at least one third vacuum device coupled to the third portion 20. Further, the base element 12 includes at least one hinge or break point in the third portion 20 that allows the base element 12 to be folded or disassembled into multiple pieces for storage and/or travel.

Figure 26:
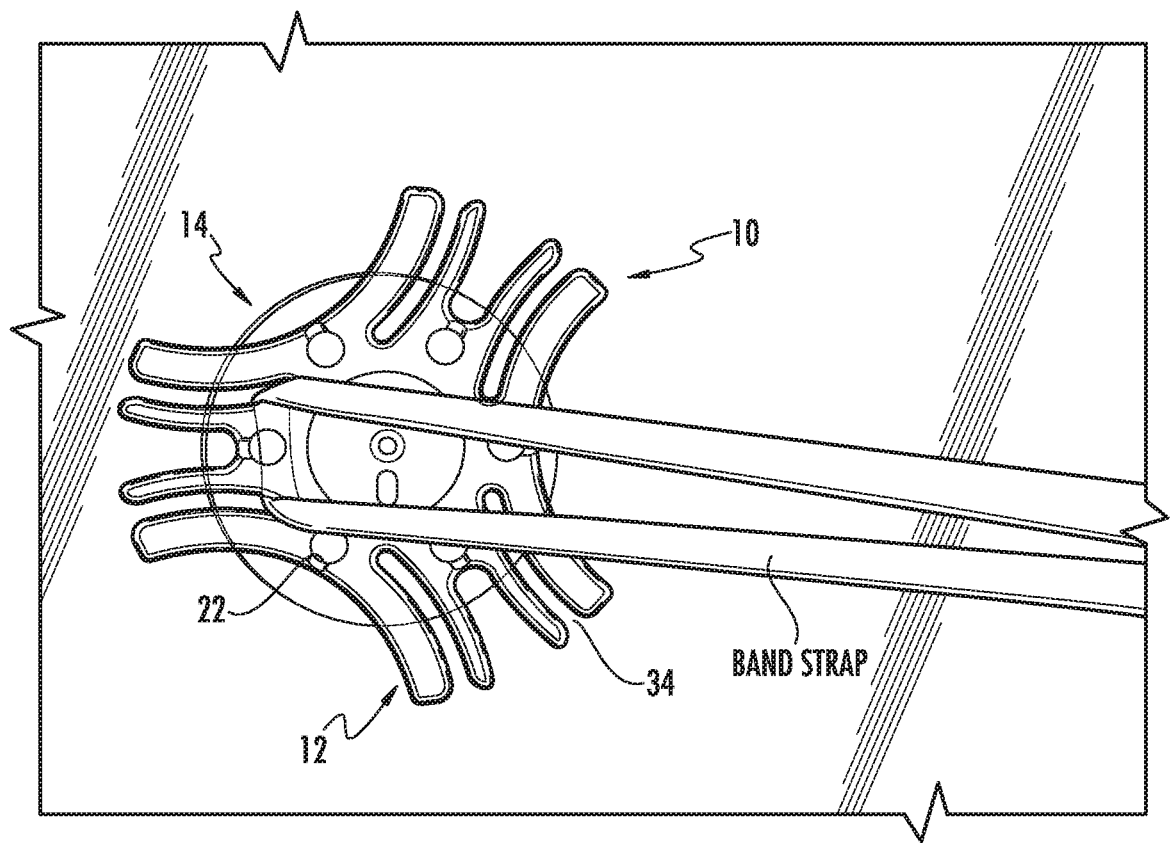
FIG. 26 shows an exemplary method of attaching a round band to the vacuum-mounted fitness assembly of FIG. 25.
Figure 27:
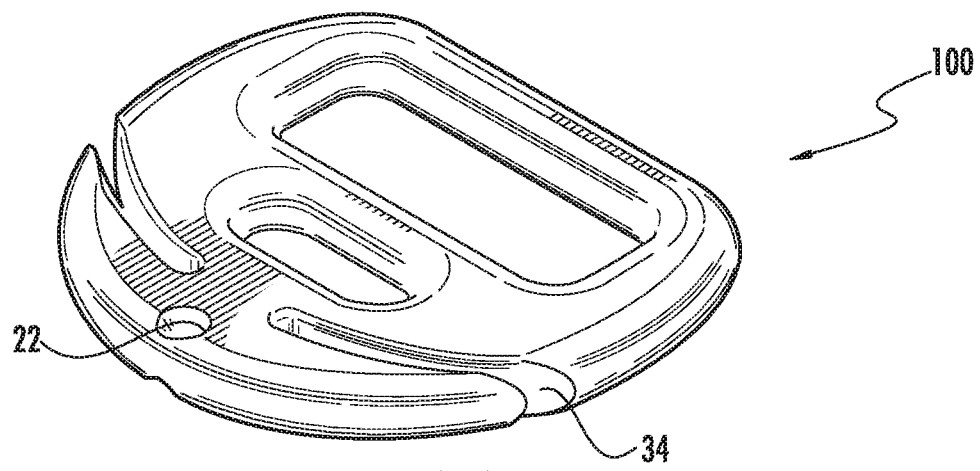
FIG. 27 shows an exemplary embodiment of a handle for use with a vacuum-mounted fitness assembly.
Figure 28:
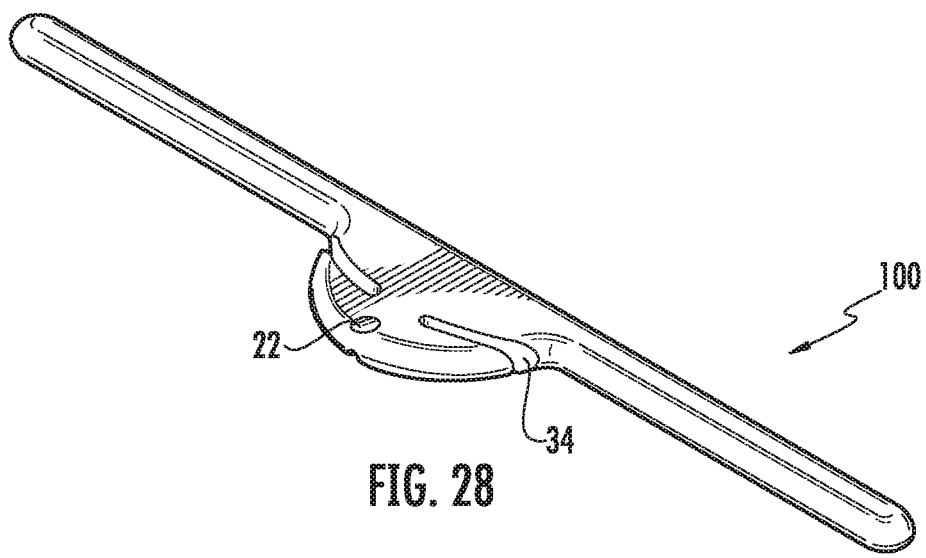
FIG. 28 shows another exemplary embodiment of a handle for use with a vacuum-mounted fitness assembly.
Figure 29:
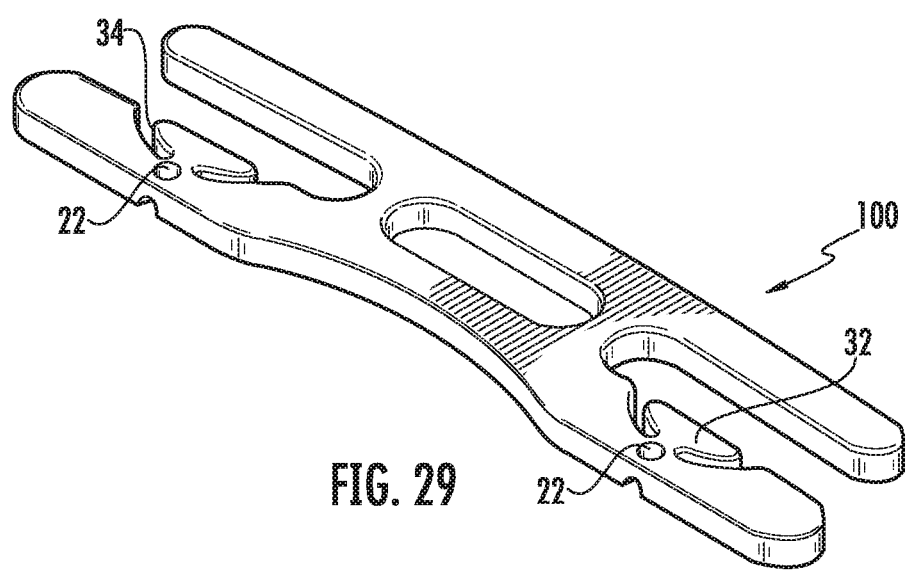
FIG. 29 shows another exemplary embodiment of a handle for use with a vacuum-mounted fitness assembly.
Figure 30:
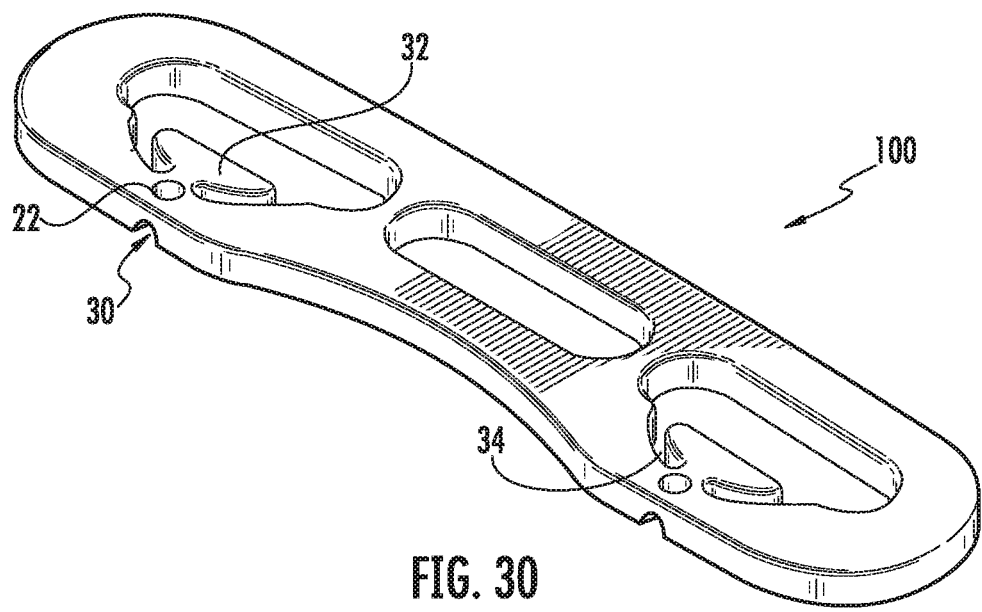
FIG. 30 shows another exemplary embodiment of a handle for use with a vacuum-mounted fitness assembly.

Referring now to FIGS. 22-26, additional embodiments of a base element 12 for use with a vacuum-mounted fitness assembly 10 are shown. In one embodiments, the base element 12 generally has a circular, or non-elongated, shape and is configured to be attached to one vacuum device 14. For example, the rear surface 26 of the base element 12 includes a recessed portion 48 at the center of the rear surface 26 of the base element 12 that is sized and configured to receive at least a portion of the housing 46 of the vacuum device 14. Further, the base element 12 includes a variety of apertures 22 and/or slits to which one or more bands (for example, round band(s) and/or flat band(s)) and/or straps may be attached (for example, as shown in FIGS. 24-26). In one embodiment, the base element 12 has a plurality of wedges 32 each created by two slits 34 extending generally inward from the edge of the base element 12. In one embodiment, the slits are curved or curvilinear (have a slight curvature). In the embodiment shown in FIGS. 22 and 23, the base element 12 includes a plurality of slits 34 extending inward from the edge of the base element 12. The base element 12s of FIGS. 22-26 may be useful when the area of the mounting surface is too small to accommodate a fitness assembly including more than one vacuum device 14.

Referring now to FIGS. 27-30, exemplary embodiments of handles 100 for use with a vacuum-mounted fitness assembly 10 are shown. The handles 100 of FIGS. 27-30 are configured to be attached to at least one strap or band. For example, the handles 100 of FIGS. 27 and 28 include an aperture 22 through which a band or strap, or an attachment mechanism such as a carabiner, may be passed to attach the handle 100 to the band or strap. The handle 100 of FIG. 27 may be used for one-handed exercises, such as single bicep curls or single triceps extensions, or may be configured to be passed over the user's foot to perform exercises such as hamstring curls, adductor or abductor exercises, or the like. The handle 100 of FIG. 28 may be used for two-handed exercises, such as bicep curls, triceps extensions, or the like. The handles of FIGS. 29 and 30 include two apertures 22 and/or two wedges 32 through which a band or strap, or an attachment element such as a carabiner, may be passed to attach the handle 100 to at least one band or strap. For example, a strap may be passed over or through a slit 34 and/or aperture 22 in the base element 12 and/or accessory arm 56 and each end of the band or strap may be attached to the handle 100. Alternatively, a first band or strap may be attached to the first aperture 22 and a second band or strap may be attached to the second aperture 22, which each band or strap also being attached to the base element 12. The handles 100 of FIGS. 29 and 30 may be used similarly to the handle 100 of FIG. 28.

In another embodiment, a vacuum-mounted fitness assembly 10 and an exemplary embodiment of an accessory for use with the vacuum-mounted fitness assembly 10 includes a mat having a low coefficient of friction. In use, the slide mat may be placed on a floor or other surface near a mounting surface and the fitness assembly 10 may be mounted to the mounting surface. In one non-limiting example of a method of use, the user sits in or on a chair or other device that is slidable over the slide mat and pull on a handle 100 attached to one or more bands or straps (that are also attached to the base element 12 of the fitness assembly) to slide the chair over the slide mat, thereby drawing the chair closer to the mounting surface. The user then pushes their feet against the mounting surface (or foot plate, not shown in the drawings) to slide the chair over the slide mat and away from the mounting surface. Thus, in one embodiment, the slide mat may allow the fitness assembly to be used like a rowing machine. However, it will be understood that the slide mat and fitness assembly may be used to perform different exercises. For example, the slide mat may be used without a chair or other device, and the user may lie on the slide mat, place their feet on and push against a foot plate, mounting surface, or other surface to perform exercises such as leg presses with the user sliding back and forth along the slide mat.

In another embodiment, the accessory includes a slide mat and a sliding seat. In one embodiment, the sliding seat is sized and configured to support an adult user sitting thereon (for example, the sliding seat may be able to support up to 350 lbs or more) and has a height that allows the user to comfortably sit on the sliding seat. In one embodiment, the sliding seat includes a solid body, which may be composed of a rigid material such as plastic, wood, metal, or the like. The body includes a bottom surface that is composed of or includes a slide material having a low coefficient of friction and that slides easily along the slide mat, and, optionally, the body includes a top surface opposite the bottom surface that includes a seat cushion (not shown in the figures). The slide material and/or the seat cushion may be removably attached to the body.

Also a non-limiting example of performing a rowing exercise. The user sits on the sliding seat and places their feet against a foot plate of a fitness assembly 10, which is mounted to the mounting surface at a height that is not too far above the slide mat. In one embodiment, the fitness assembly 10 is mounted to the mounting surface at a height of approximately 1.0-1.5 feet from the slide mat, or at a height at which the base element 12 is level with the user when the user is sitting on the sliding seat and/or the slide mat.

Additional exemplary embodiments of accessories for use with a vacuum-mounted fitness assembly 10 include a mounting surface panel that is configured to be removably coupled to a base surface, such as a wall or door. In use the fitness assembly 10 is mounted to the mounting surface panel. The mounting surface panel may be useful when the user does not have an available mounting surface that is smooth enough to provide a secure coupling between the vacuum device(s) 14 of the fitness assembly 10 and the mounting surface. Thus, the surface to which the fitness assembly 10 is mounted is composed of a smooth, non-porous material (such as plastic, metal, or glass) that facilitates good suction between the vacuum device(s) 14 and the mounting surface panel. In one embodiment, the mounting surface panel is composed of a thin, lightweight metal such as stainless steel or aluminum. The mounting surface panel also includes hanging or mounting hardware (not shown) by which the mounting surface panel may be securably affixed to the mounting surface. In one embodiment, the mounting surface panel is thin enough to fit behind a picture or mirror when not in use. For example, the mounting surface panel may be between $1/16$ inch and $1/8$ inch thick.

In another embodiment, the accessories include a floor mounting surface panel to which the fitness assembly 10 may be mounted. The floor mounting surface panel may be useful when the user does not have a floor or horizontal surface that is smooth enough to provide a secure coupling between the vacuum device(s) 14 and the floor mounting surface. For example, the user may couple the fitness assembly 10 to the floor mounting surface to perform exercises such as biceps curls, overhead presses, and the like. Like the mounting surface panel, the surface of the floor mounting surface panel to which the fitness assembly is mounted is composed of a smooth, non-porous material, such as plastic, metal, glass, polycarbonate (for example, a clear polycarbonate), or the like. In one embodiment, the floor mounting surface panel is between approximately $1/4$ inch and 1 inch thick. In use, the floor mounting surface panel is placed on the floor or other horizontal surface, the fitness assembly 10 is coupled to the floor mounting surface panel, and the user performs the desired exercises while standing on the floor mounting surface panel.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A vacuum-mounted fitness assembly, comprising:
   a base element;
   at least one vacuum device removably coupled to the base element;
   a first accessory arm and a second accessory arm each removably coupled to and extending away from the base element, each of the first accessory arm and the second accessory arm including a plurality of apertures; and
   a stabilization bar removably coupled to and extending between the first accessory arm and the second accessory arm.

2. The vacuum-mounted fitness assembly of claim 1, wherein each of the first and second accessory arms includes a first portion having a first longitudinal axis and a second portion having a second longitudinal axis that is different than the first longitudinal axis.

3. The vacuum-mounted fitness assembly of claim 2, wherein the first portion of each of the first and second accessory arms is in contact with the base element and the stabilization bar extends between the second portions of the first and second accessory arms.

4. The vacuum-mounted fitness assembly of claim 2, further comprising:
   a support element removably coupled to and extending between the first accessory arm and the second accessory arm; and
   a vacuum device removably coupled to the support element.

5. The vacuum-mounted fitness assembly of claim 4, wherein the support element is removably coupled to and extends between the first portions of the first and second accessory arms.

6. The vacuum-mounted fitness assembly of claim 1, wherein the base element has an elongated shape and includes a first portion, a second portion opposite the first portion, and a third portion between the first and second portions, and the at least one vacuum device includes a first vacuum device removably coupled to the first portion of the base element and a second vacuum device removably coupled to the second portion of the base element.

7. The vacuum-mounted fitness assembly of claim 1, wherein the at least one vacuum device includes a single vacuum device removably coupled to the base element at a center point of the base element.

8. The vacuum-mounted fitness assembly of claim 1, wherein the base element includes a plurality of apertures.

9. The vacuum-mounted fitness assembly of claim 1, wherein the base element includes at least one wedge defined by two slits in the base element.

10. A vacuum-mounted fitness assembly, comprising:
    a base element including a plurality of apertures sized to receive one or more fitness bands, the base element having elongated shape and including a first portion, a second portion opposite the first portion, and a third portion between the first and second portions, the third portion defining a height less than a height of the first and second portions; and
    at least one vacuum device includes a first vacuum device removably coupled to the first portion of the base element and a second vacuum device removably coupled to the second portion of the base element.

11. The vacuum-mounted fitness assembly of claim 10, further comprising:
    a first accessory arm and a second accessory arm each removably coupled to and extending away from the base element, each of the first accessory arm and the second accessory arm including a plurality of apertures; and
    a stabilization bar removably coupled to and extending between the first accessory arm and the second accessory arm.

12. The vacuum-mounted fitness assembly of claim 11, wherein each of the first and second accessory arms includes a first portion having a first longitudinal axis and a second portion having a second longitudinal axis that is different than the first longitudinal axis.

13. The vacuum-mounted fitness assembly of claim 12, wherein the first portion of each of the first and second accessory arms is in contact with the base element and the stabilization bar extends between the second portions of the first and second accessory arms.

14. The vacuum-mounted fitness assembly of claim 12, further comprising:
    a support element removably coupled to and extending between the first accessory arm and the second accessory arm; and
    the at least one vacuum device is removably coupled to the support element.

15. The vacuum-mounted fitness assembly of claim 14, wherein the support element is removably coupled to and extends between the first portions of the first and second accessory arms.

16. The vacuum-mounted fitness assembly of claim 10, wherein the base element includes at least one wedge defined by two slits in the base element.

17. The vacuum-mounted fitness assembly of claim 10, wherein the base element is planar.

18. The vacuum-mounted fitness assembly of claim 10, wherein the first portion and the second portion define the same height.

19. A vacuum-mounted fitness assembly, comprising:
    a base element;
    a first vacuum device removably coupled to a first portion of the base element and a second vacuum device removably coupled to a second portion of the base element;
    a bag support plate removably coupled to and extending away from the base element, the bag support plate having a first surface and a second surface opposite the first surface;
    a first plate support arm and a second plate support arm, each of the first plate support arm and the second plate support arm having a first portion removably coupled to the base element and a second portion extending away from the base element in direction that is parallel to the first plate support arm and the second plate support arm;
    a stabilization bar removably coupled to and extending between the second portions of the first plate support arm and the second plate support arm, the stabilization bar being removably coupled to the first surface of the bag support plate;

a first support element removably coupled to and extending between the first portions of the first plate support arm and the second plate support arm;
a third vacuum device removably coupled to the first support element; and
a second support element removably coupled to and extending between the second portions of the first plate support arm and the second plate support arm.

* * * * *